United States Patent [19]
Kobayashi

[11] Patent Number: 6,097,695
[45] Date of Patent: Aug. 1, 2000

[54] OPTICAL DISK WITH A GROOVE FOR DEFINING SERIAL DATA MODULATED INTO A SIGNAL USING MODULATION PROCESSING

[75] Inventor: Shoei Kobayashi, Kanagawa, Japan

[73] Assignee: Sony Corporation, Tokyo, Japan

[21] Appl. No.: 09/073,383

[22] Filed: May 6, 1998

[30] Foreign Application Priority Data

May 19, 1997 [JP] Japan .................................. 9-127726

[51] Int. Cl.⁷ .................................................. G11B 7/24
[52] U.S. Cl. ................................ 369/275.4; 369/275.5
[58] Field of Search ........................... 369/275.4, 275.5, 369/283, 58, 14, 124

[56] References Cited

U.S. PATENT DOCUMENTS

| | | | |
|---|---|---|---|
| 4,807,204 | 2/1989 | Mizutani et al. | 369/13 |
| 5,255,260 | 10/1993 | Yamada et al. | 369/199 |
| 5,276,674 | 1/1994 | Tanaka | 369/275.3 |
| 5,392,263 | 2/1995 | Watanabe et al. | 369/13 |
| 5,592,450 | 1/1997 | Yonemitsu et al. | 369/48 |
| 5,910,932 | 6/1999 | Watanabe et al. | 369/13 |

Primary Examiner—Tan Dinh
Attorney, Agent, or Firm—Frommer Lawrence & Haug, LLP.; William S. Frommer

[57] ABSTRACT

An optical disc has a track pitch of up to 0.64 $\mu$m and a light transmitting layer thickness of up to 177 $\mu$m. An optical disc apparatus for reliably detecting an address recorded on the optical disc utilizes the information recording surface with high density recording on the disc. The address data such as position information is recorded to the optical disc using a groove formed as the laser beam guiding groove. The groove is formed by modulating a signal formed by bi-phase modulating the address data.

22 Claims, 24 Drawing Sheets

F I G. 12
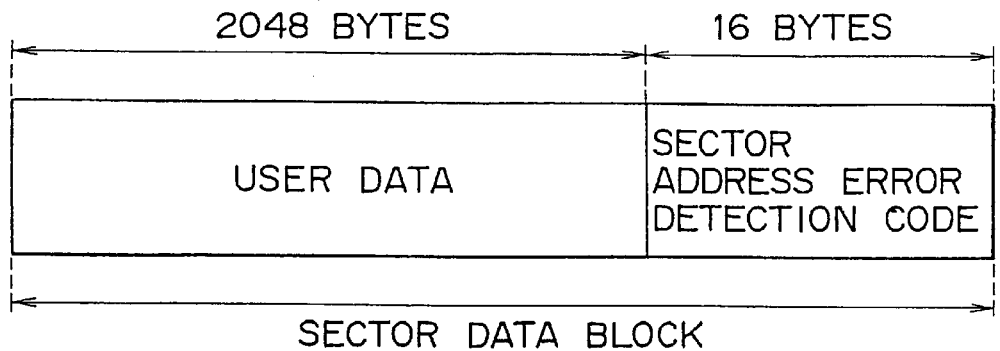
F I G. 13
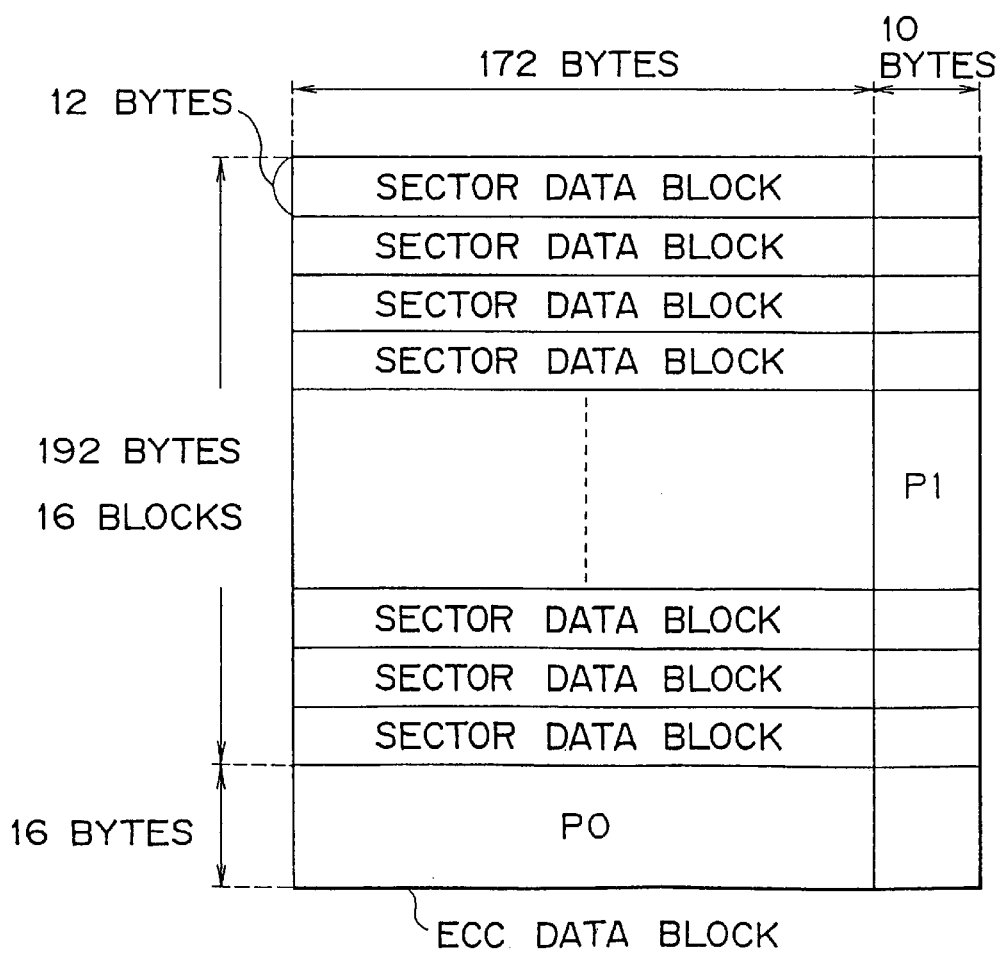

FRAME FORMAT

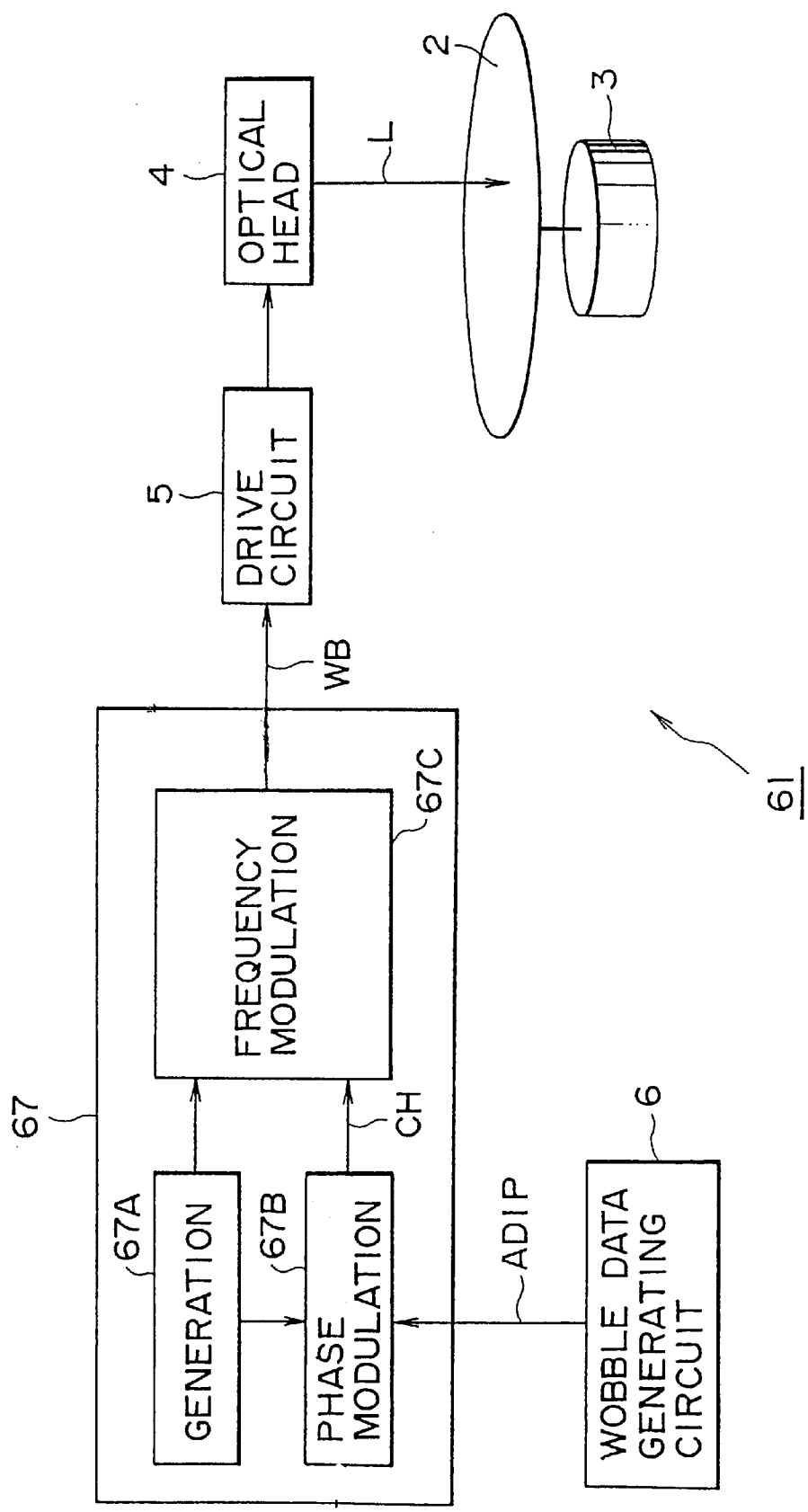

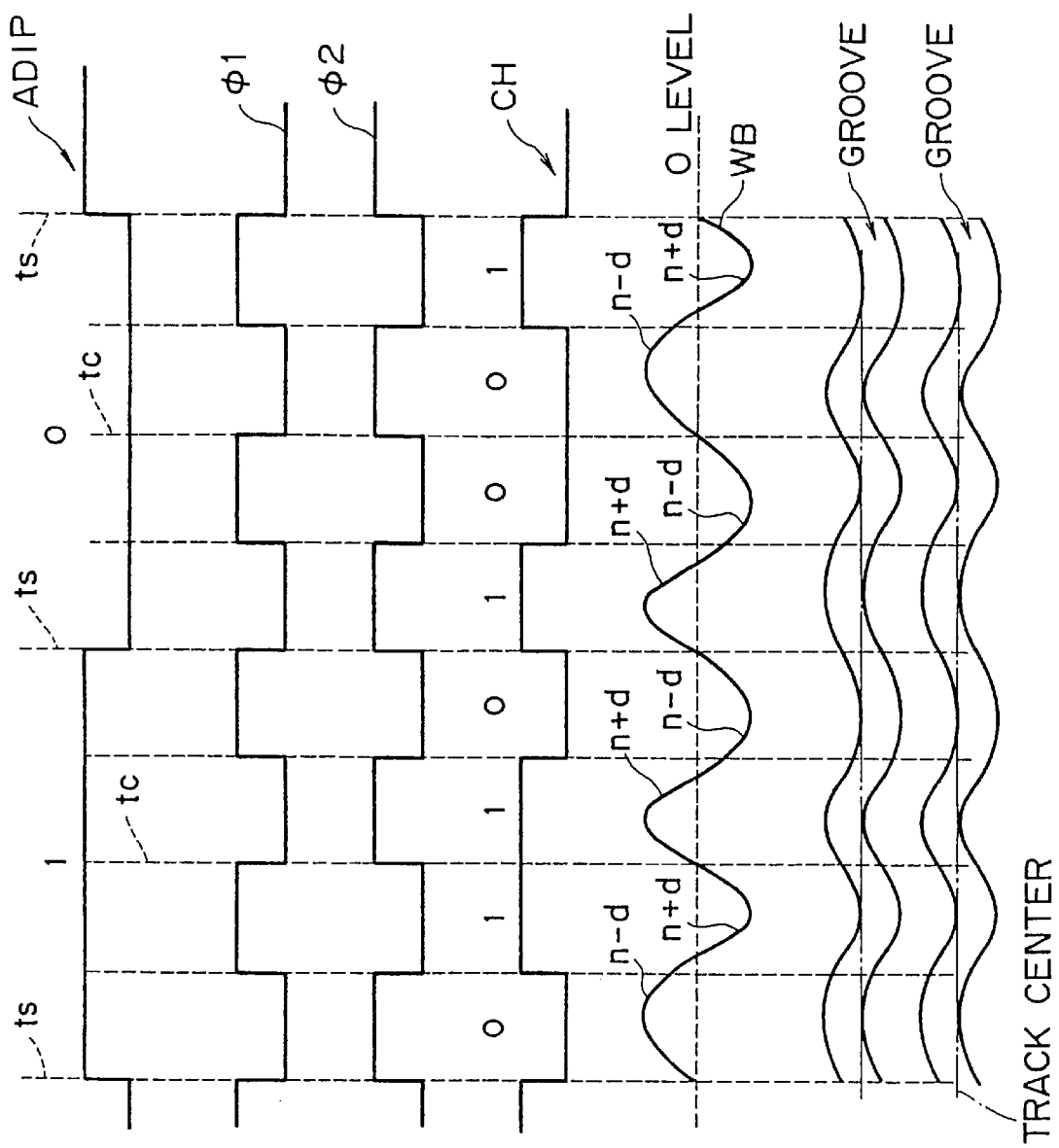

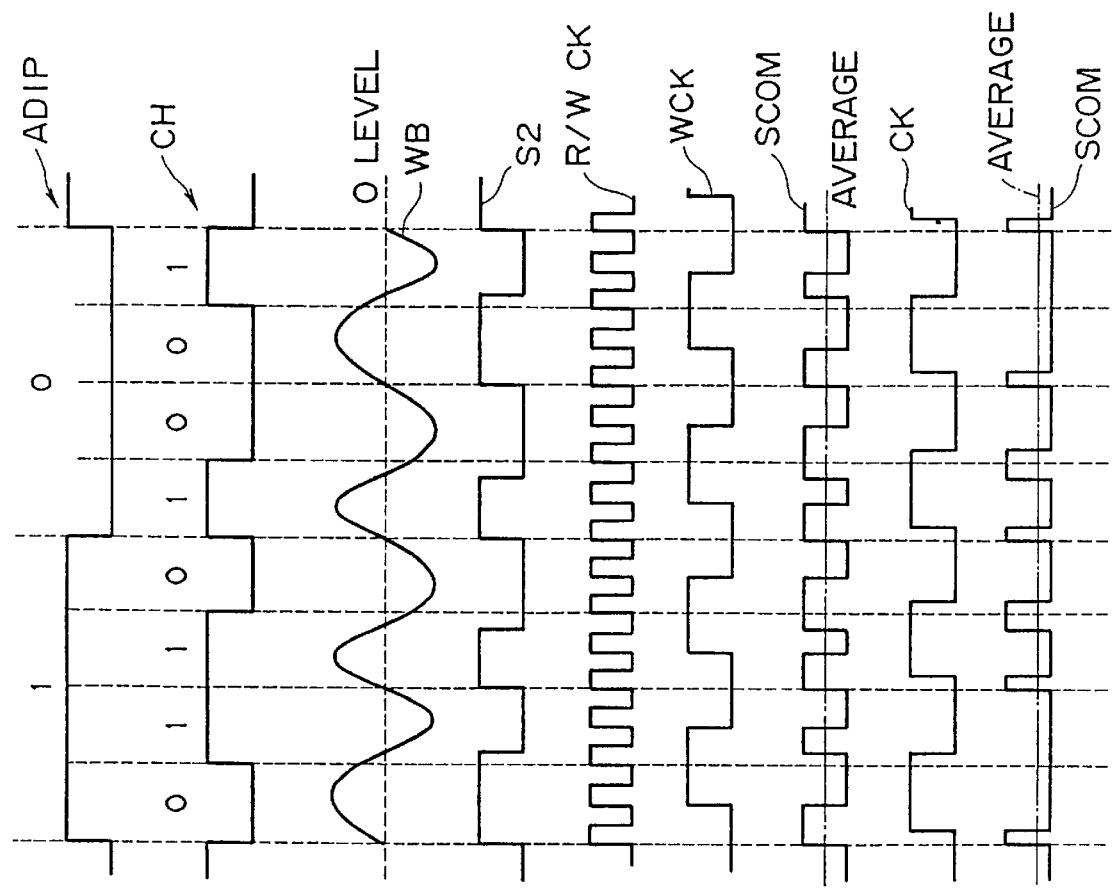

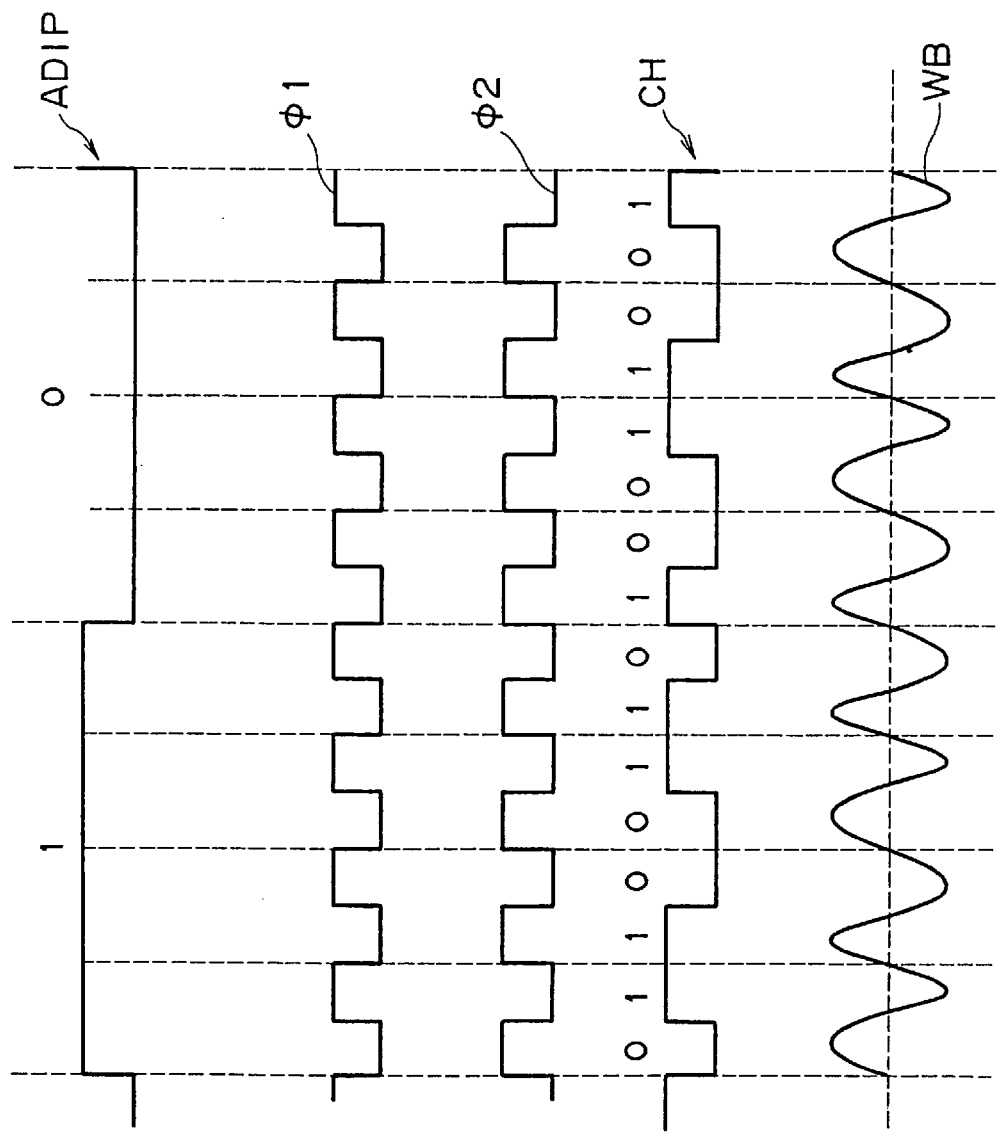

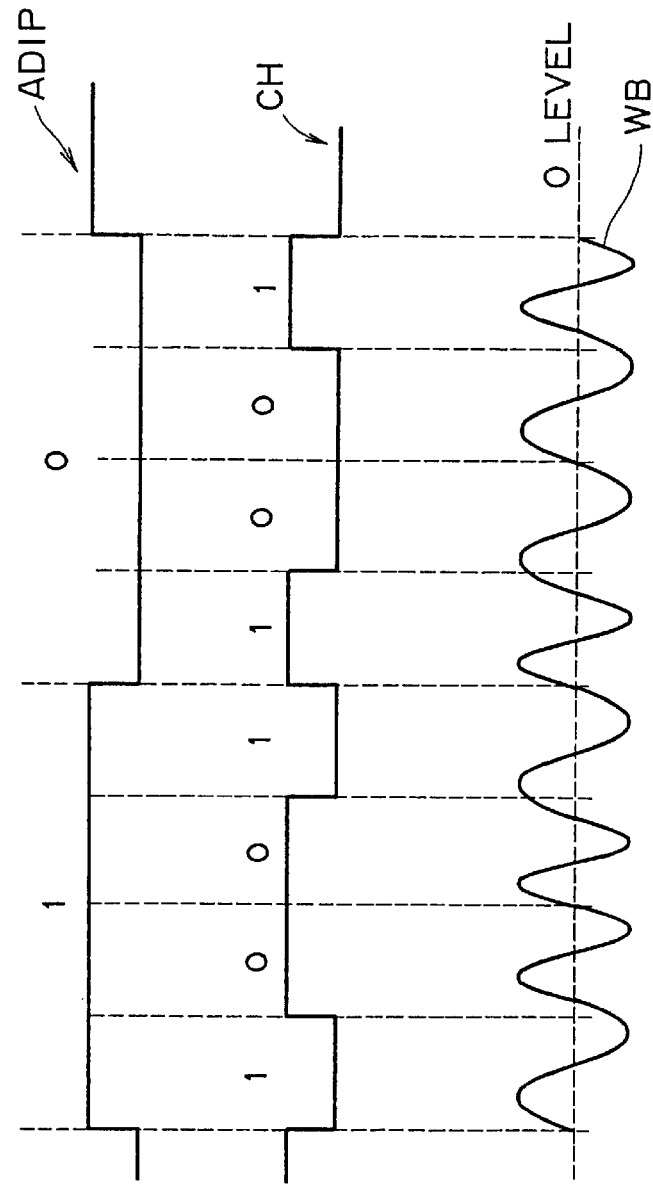

OPTICAL DISK WITH A GROOVE FOR DEFINING SERIAL DATA MODULATED INTO A SIGNAL USING MODULATION PROCESSING

BACKGROUND OF THE INVENTION

The present invention relates to a method of manufacturing an optical disc and optical disc apparatus and can be applied, for example, to a phase changing type of optical disc. The present invention can reliably detect addresses recorded in an optical disc by effectively utilizing an information recording surface even when data is recorded at high density. Address data, such as position information, is recorded to an optical disc using a spiral groove formed as a laser beam guide groove.

In an optical disc apparatus for recording information of high recording density, the desired data is recorded in sectors with reference to the address data recorded previously to an optical disc by a pre-pit.

Namely, an optical disc of this type forms sectors by dividing the information recording surface using a predetermined angular interval. In each sector, a sector address is recorded by a pre-pit at a starting area, and the subsequent area is assigned to a user area.

An optical disc apparatus obtains blocks from user data which are sequentially input in units of 2048 bytes and records the blocks in the user area of each sector with reference to the sector addresses recorded in the optical disc.

As an optical disc apparatus of this type, a DVD (Digital Versatile Disc) has been proposed. In the DVD, a laser beam having wavelength of 650 [nm] is irradiated to an optical disc through an optical system having a numerical aperture 0.6 to record the data of 2.6 [MB] at a single surface. In such DVD, a video signal can be recorded for about an hour with the single surface.

Meanwhile, in a home video tape recorder, the basic recording time is two hours. Moreover, a video signal recorded for about three hours should support an editing operation, etc. by effectively utilizing the random access function of an optical disc. With reference to the DVD system in this case, it is required to accommodate the data of about 8 [MB] for recording.

The recording density of the optical disk of this type can further be improved by accessing the optical disc using the optical system of higher numerical aperture. In this case, an optical disk is formed by setting thickness, for example, of an optical transmitting layer to about 1 [mm] by lowering the allowable skew margin of the optical disk apparatus.

However, when thickness of the optical transmitting layer is set to about 0.1 [mm], it becomes difficult to correctly reproduce sector address and user data because of dust adhered to the disk surface. In this case, to reduce the harmful effect of dust, etc., error correction capability may be enhanced for user data. However, in regard to sector address, when error correction capability is increased, capacity for the user area is greatly reduced, and it also becomes difficult to effectively use the information recording surface.

SUMMARY OF THE INVENTION

The present invention has been implemented in view of the foregoing. Accordingly, in a method for manufacturing an optical disc having a light transmitting layer and an information recording surface for recording predetermined data by a laser beam directed to the information recording surface through the light transmitting layer, the following steps are carried out: providing a groove on the information recording surface for guiding the laser beam according to address data containing at least one of time information and position information; setting a track pitch to about 0.64 µm or less in the groove; and forming the light transmitting layer having a thickness of approximately 177 µm or less.

According to one aspect of the present invention, the thickness of the light transmitting layer is between 10 and 177 µm.

According to another aspect of the present invention, the inventive method further includes the steps of generating a first modulated signal by bi-phase modulating the address data, generating a second modulated signal by frequency modulating the generated first modulated signal, and forming the groove on the optical disc in accordance with the generated second modulated signal.

According to yet another aspect of the present invention, the inventive method further includes the steps of generating a first modulated signal by bi-phase modulating the address data, generating a second modulated signal by phase modulating the generated first modulated signal, and forming the groove on the optical disc in accordance with the generated second modulated signal

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 12 is a diagram for explaining a sector format in the optical disc apparatus of FIG. 11;

FIG. 13 is a diagram showing an ECC block in the optical disc apparatus of FIG. 11;

FIG. 16 is a block diagram showing the mastering apparatus in the second embodiment of the present invention;

FIG. 17A to FIG. 17E show signal waveforms for explaining the wobble signals generated by the mastering apparatus of FIG. 16;

FIG. 21A to FIG. 21I show signal waveforms for explaining operations of the wobble signal processing circuit of FIG. 20;

FIG. 23A to FIG. 23D show signal waveforms for explaining processing and generation of the wobble signals in other embodiments;

FIG. 24A to FIG. 24C show signal waveforms for explaining processing and generation of wobble signals in other embodiments of FIG. 23A to FIG. 23D.

DETAILED DESCRIPTION OF THE PREFERRED EMBODIMENTS

The preferred embodiments of the present invention will be explained in detail with reference to the accompanying drawings.

(1) First Embodiment (1-1) Structure of the embodiment

Figure 1:
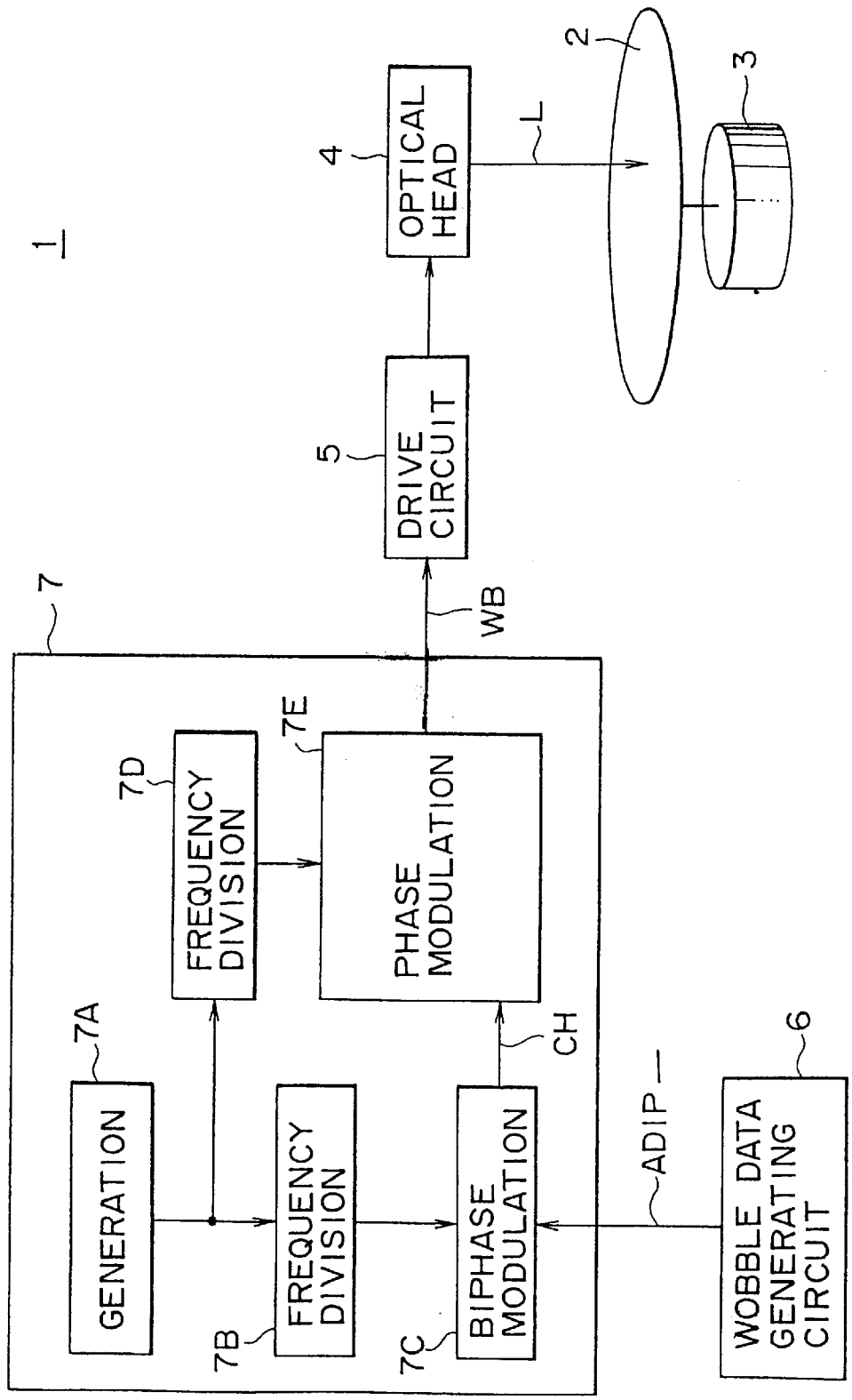
FIG. 1 is a block diagram showing a mastering (master) apparatus in relation to a first embodiment of the present invention.

FIG. 1 is a block diagram showing a mastering (master) apparatus in the first embodiment of the present invention. In the manufacturing process of an optical disc in this embodiment, an original disc 2 is produced by this mastering apparatus 1 and optical discs can be manufactured from this original disc 2.

In the mastering apparatus 1, an original disc 2 is formed, for example, by coating the surface with resist and is then driven by a spindle motor 3 to rotate with a constant angular velocity.

The optical head 4 directs the laser beam L to the original disc 2 while the disc is sequentially displaced by a sled mechanism (not shown), toward the external (outside or outer) circumference of the disc from the internal (inside or inner) circumference in synchronization with the rotation. Thereby, the optical head 4 produces a spiral track to the outside circumference portion from the inside circumference portion of the original disc 2. In this case, the optical head 4 is controlled by the sled mechanism to move by about 1.0 [μm] with the period in which the original disc 2 makes one turn. Accordingly, when the track pitch formed by the groove is set to about 1.0 [μm] and the track is also formed at the land between the grooves (namely, in the case of land/groove recording), the track can be formed in the track pitch of 0.5 [μm]. The track pitch in this land/groove recording is about is 1.48 times the track pitch of 0.74 [μm] in the DVD.

Therefore, in the mastering apparatus 1, data is recorded with a recording density of about 0.21 [μm/bit] for the optical disc manufactured from the original disc 2 in order to record the data of 8 [GB] or more depending on the following formula.

$$4.7\times\{(0.74\times0.267)/(0.5\times0.21)\}\geq 8 \tag{1}$$

Here, 4.7 is the recording capacity in [GB] of DVD, while 0.74 and 0.267 are track pitch numbers of the DVD and line recording density [μm/bit]. Therefore, in the formula (1), the recording capacity by the data process is the same as for DVD.

Moreover, in this case, the optical head 4 sets the spot diameter of the laser beam L, when an optical disc is manufactured from the optical disc 2, in such a manner that the spot diameter is almost the same as the interval between the groove formed by the exposure of the laser beam L and the adjacent groove. The spot shape of the laser beam and the laser beam intensity are set so that the effective exposure range by the laser beam is increased by about 120 [%] for the width of a groove as the final target.

The optical head 4 moves the optical system in the radial direction of the original disc 2, and a drive circuit 5 drives the optical system of the optical head 4 depending on the wobble signal WB. Thereby, in the mastering apparatus 1, the radiation (illuminating) position of the laser beam L follows a pattern depending on the wobble signal WE.

A wobble data producing circuit 6 produces and outputs wobble data ADIP which sequentially changes its value depending on displacement of the optical head 4. Namely, the wobble data producing circuit 6 receives a timing signal (formed of FG signal, etc.) synchronized with the rotation of the original disc 2 and counts this timing signal using a predetermined counter. Thereby, the wobble data producing circuit 6 produces, in the period in which the original disc 2 rotates, for example, for 1/16 of a turn, a frame number (Sync no) which sequentially and cyclically changes its value and a track number (Track no.) which changes its value each time the radiation position of the laser beam L is displaced by one track corresponding to the change of the frame number (Sync no).

Thereby, the wobble data producing circuit 6 produces address data including the frame number (Sync no) and track number (Track no).

Figure 2:
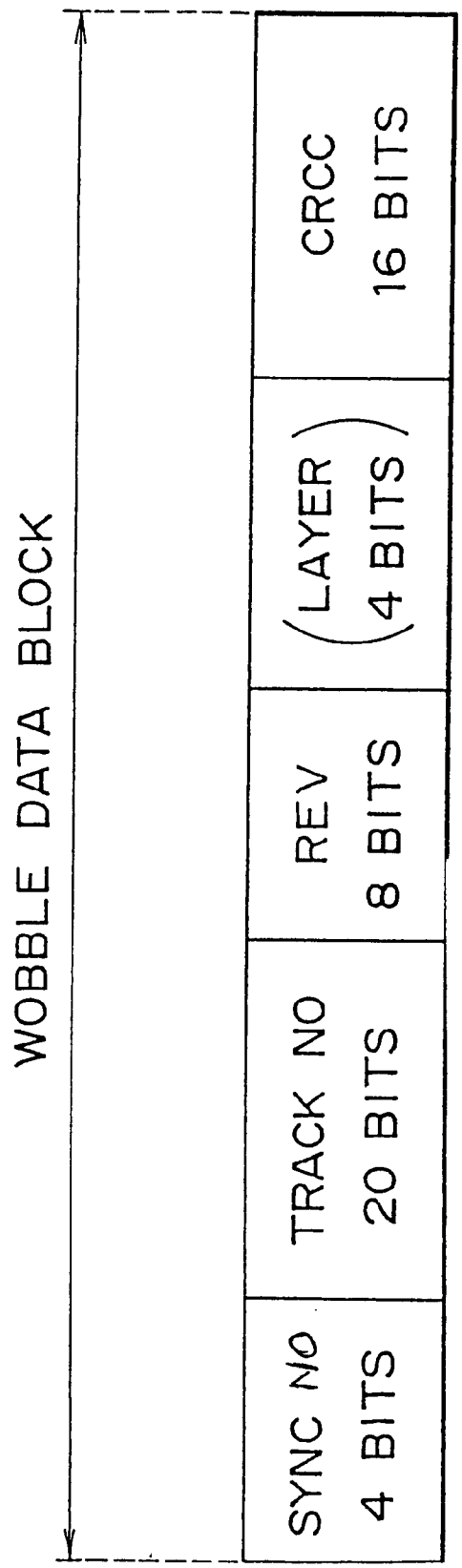
FIG. 2 is a diagram for explaining a format of wobble data obtained by the mastering apparatus of FIG. 1.
Figure 3:
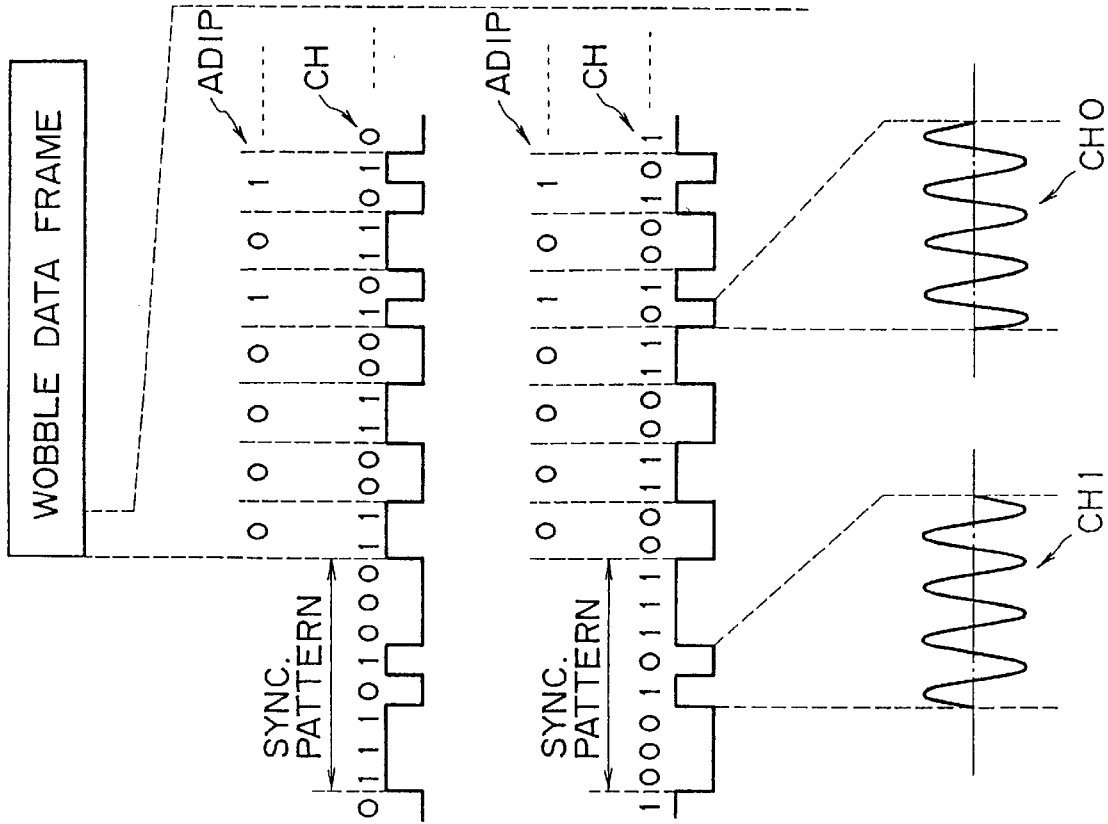
FIGS. 3A–3F are signal diagrams illustrating the generation of a wobble data frame according to this embodiment.

Moreover, the wobble data producing circuit 6 adds a reserve bit (rev) to the frame number (Sync no) and track number (Track no) and executes predetermined arithmetic processing operations using the information word M(x) consisting of the frame number (Sync no), track number (Track no) and reserve bit (rev) to produce an error detection code CRCC (Cyclic Redundancy Check Code) in view of sequentially producing the wobble data block of the format shown in FIG. 2. Here, the wobble data producing circuit 6 forms each wobble data block with 48 bits.

The wobble data producing circuit 6 sets inverse logic level of the error detection code CRCC or manipulates the reserve bit (rev) to generate the wobble data in such a manner that bit inversion is generated once in one address data block. Moreover, the subsequent four bits are assigned, as required, to the data of the recording layer. The optical disc produced from the original disc 2 has a number of information recording layers and each information recording layer can be identified by the data of this recording layer. The wobble data producing circuit 6 is used, in the case of setting the data of the recording layer, for calculation of the error detection code CRCC using the data of the recording layer as the information word M(x).

The wobble data producing circuit 6 sequentially produces, as explained above, the wobble data frame synchronization with the rotation of the original disc 2 and also converts the produced wobble data frame to the serial data synchronized with the rotation of the original disc 2 and then outputs sequentially this serial data to the wobble signal generating circuit 7 as the wobble data ADIP.

The wobble signal generating circuit 7 produces a wobble signal WB from the wobble data ADIP, etc. In the wobble signal generating circuit 7, the generating circuit 7A produces the reference signal having a frequency of 115.2 [kHz]. In this mastering apparatus 1, the spindle motor 3 is controlled by the reference signal to generate the wobble signal WB synchronized with rotation of the original disc 2. A frequency dividing circuit 7B divides the frequency of the reference signal (115.2 [kHz]) by ⅛ to produce the reference clock of 14.4 [kHz].

As shown in FIGS. 3A–3F, a biphase modulation circuit 7C sequentially selects, depending on the logical level of the wobble data ADIP, a first reference clock synchronized with the phase of the reference clock of 14.4 [kHz] and a second reference clock having its frequency set to ½ of the first reference clock. Thereby, the wobble data ADIP is biphase-modulated to produce a channel signal (ch).

The biphase modulation circuit 7C assigns a predetermined synchronization pattern to the leading position of the wobble data frame to produce the channel signal (ch) (FIG. 3(A) to FIG. 3(E)). With respect to this synchronization pattern, a unique pattern which is not generated by the biphase modulation and in which DSV is 0 is assigned, and a polarity is set so that the signal level of the channel signal (ch) is switched at the boundary of the wobble data frame. In this embodiment, a channel run-length of the channel signal (ch) is 1 or 2, while the synchronization pattern is the pattern of 3T, 1T, 1T, 3T using the maximum run-length coding.

The channel signal (ch) inverts the signal level at the timing corresponding to the bit boundary of the wobble data ADIP and is kept at the constant logic level because the second reference clock is assigned when the logic level of the wobble data ADIP is 0. Moreover, when the logic level of the wobble data ADIP is 0, the first reference clock is assigned and the signal level is inverted in the timing corresponding to the bit center.

The frequency dividing circuit 7D divides the frequency (115.2 [kHz]) of the reference signal by ½ to produce the reference clock for phase modulation of 57.6 [kHz] which is four times the frequency of the phase modulation clock.

A phase modulation circuit 7E produces, from the reference clock of 57.6 [kHz], the first carrier signal synchronized in phase with the reference clock and the second carrier signal which is deviated by 180 degrees in phase from the reference clock and selectively outputs these first and second carrier signals depending on the signal level of the channel signal (ch) (FIG. 3(F)). Thereby, the phase modulation circuit 7E phase-modulates the channel signal (ch) and then outputs the signal as the wobble signal WB.

Figure 4:
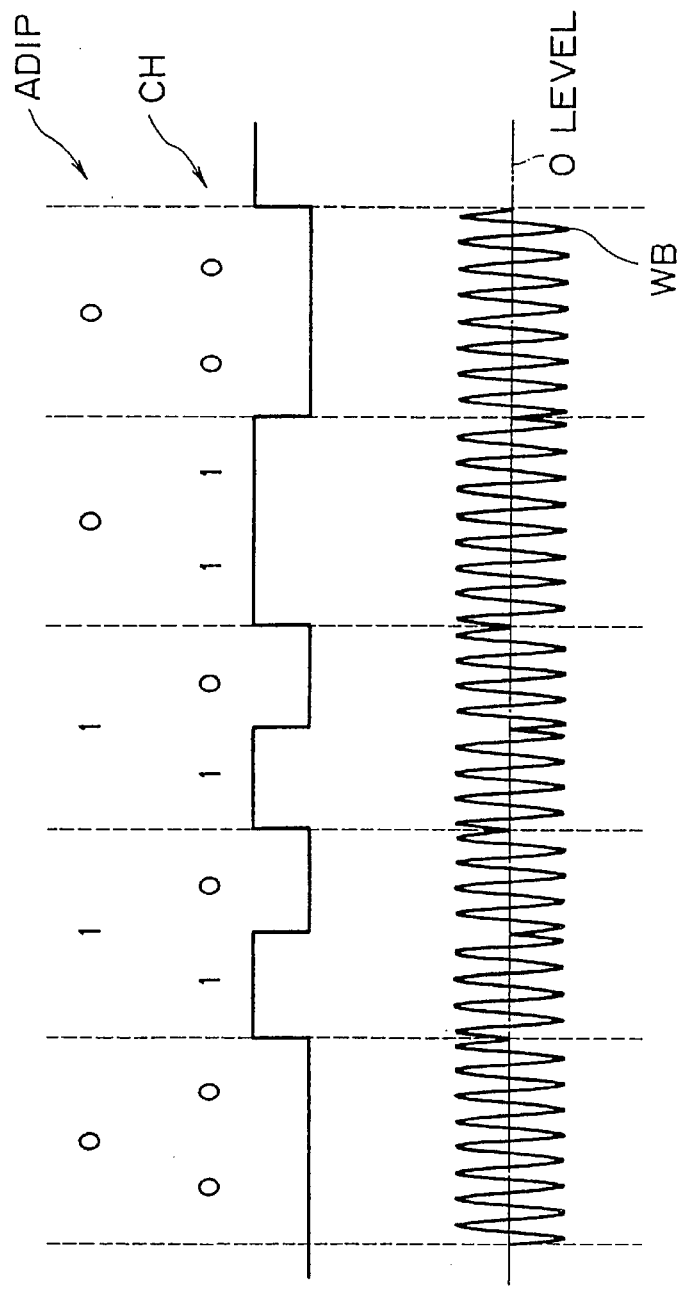
FIG. 4A to FIG. 4C show signal waveforms of the wobble signals generated by the mastering apparatus of FIG. 1.

Thereby, as shown in FIGS. 4A–4C, the wobble signal generating circuit 7 produces, after the biphase modulation of the wobble data ADIP (FIG. 4(A) and FIG. 4(B)), a phase modulated signal by single carrier frequency via the synchronization pattern and then outputs this phase modulation signal as the wobble signal WB (FIG. 4(C)).

In this embodiment, after the shape of a groove corresponding to the laser beam radiating position is formed on the surface of the original disc 2, the original disc 2 is subjected to the electroforming process to manufacture a stamper. Moreover, a disc substrate is formed using this stamper, and an optical disc is produced from this disc substrate.

Figure 5:
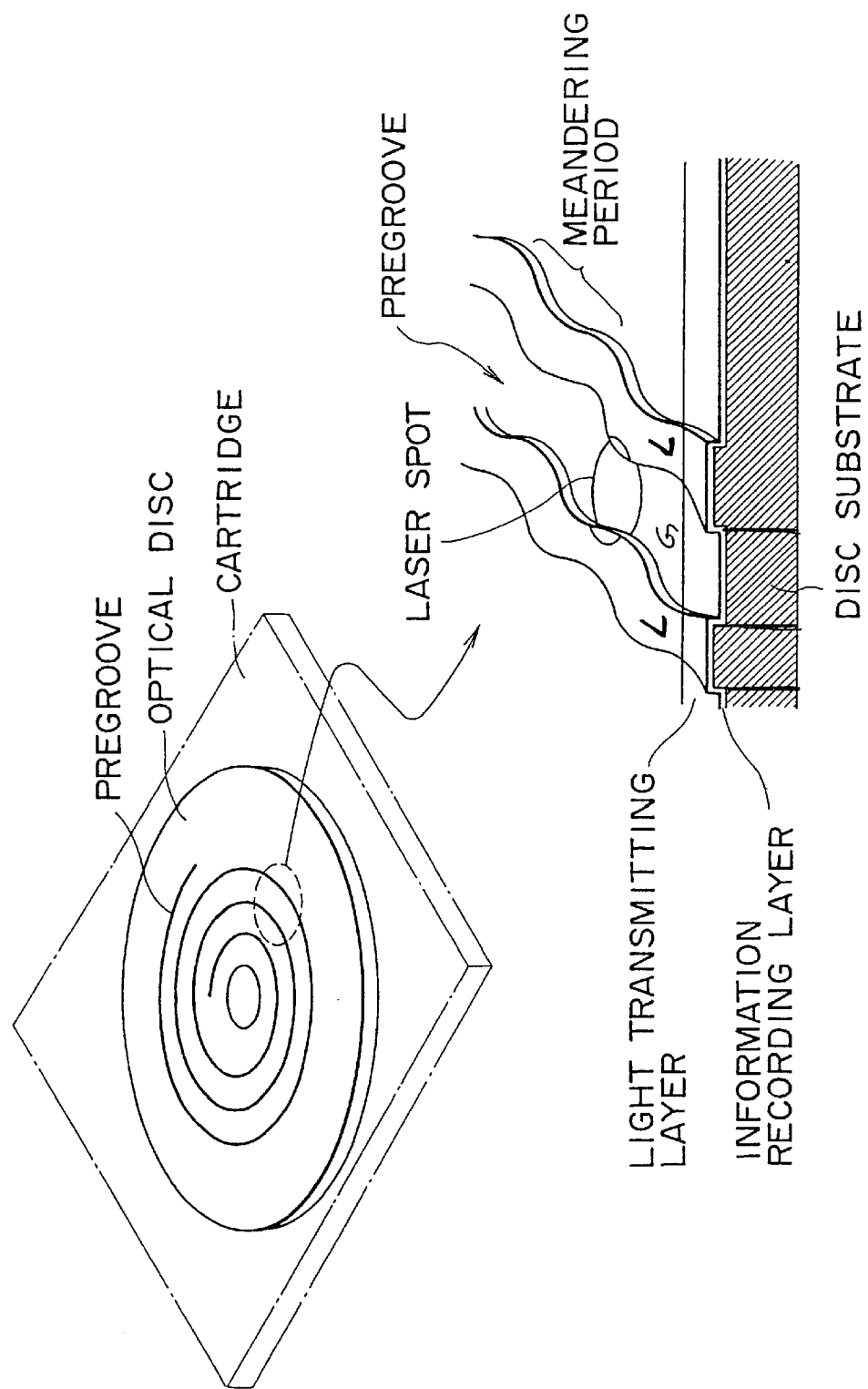
FIG. 5 is a perspective view showing an optical disc generated by the mastering apparatus of FIG. 1.

FIG. 5 is a perspective view showing an optical disc produced from the original disc 2. This optical disc is formed with a thickness of 1.2 [mm]. In the case of the phase changing type of optical disc, an aluminum film, ZnS—SiO2 film, a GeSbTe film and a ZnS—SiO2 film are sequentially formed on the disc substrate to form the information recording surface. Moreover, in the magneto-optical disk, an aluminum film, a SiN film, a TbFeCo film, a SiN film are sequentially formed on the disc substrate to form the information recording surface. In the case of the tracking type, a putter film of aluminum or gold and a predetermined organic pigment film are sequentially formed on the disc substrate to form the information recording surface.

Moreover, on this information recording surface, a light transmitting layer which allows transmission of a laser beam to guide the laser beam to the information recording surface is formed with a thickness of about 0.1 [mm]. Thereby, the optical disc in this embodiment effectively avoids the problems of skew even when the disc is illuminated with the laser beam through the optical system of high numerical aperture via the light transmitting layer. As a result, data can reliably be recorded to or reproduced from the information recording surface.

This optical disc is formed with diameter of 120 [mm], wherein the region in the radius of 24 [mm] to 58 [mm] is assigned as the recording region.

The optical disc is accommodated and stored within a predetermined cartridge which is formed to identify a type of the optical disc. The facilities are provided so that the disc can be loaded into the optical disc apparatus together with the cartridge. Hence, influence of dust may be avoided effectively even when the disc is accessed by the optical system of higher numerical aperture.

In the phase changing type of optical disc, the disc is formed to record the predetermined data by changing a local crystal structure of the information recording surface through illumination of the laser beam and to reproduce the recorded data by detecting change in the amount of light of the returned (reflected) beam.

In the magneto-optical disc, the desired data can be thermo-magnetically recorded by applying a magnetic field to the laser beam radiating position; and the recorded data can also be reproduced using the magnetic Kerr effect by detecting the polarizing plane of the returned (reflected) light. Moreover, in the additional recording type disc, the desired data can be recorded by breaking a local information recording surface through illumination of the laser beam. In addition, recorded data can be reproduced by detecting change in the amount of the reflected light.

In these cases, in the optical disc, since the groove is formed with the phase-modulated wobble signal by rotating the original disc 2 under the condition that the angular velocity is constant, the meandering (spiral) period of the groove converted to the rotating angle of the optical disc can be identical in the inside circumference side and outside circumference. This groove is formed ⅙ to ⅕ deep for the laser beam in the wavelength of 650 [nm] since the amplitude in the groove is 15 to 30 [nm].

Figure 6:
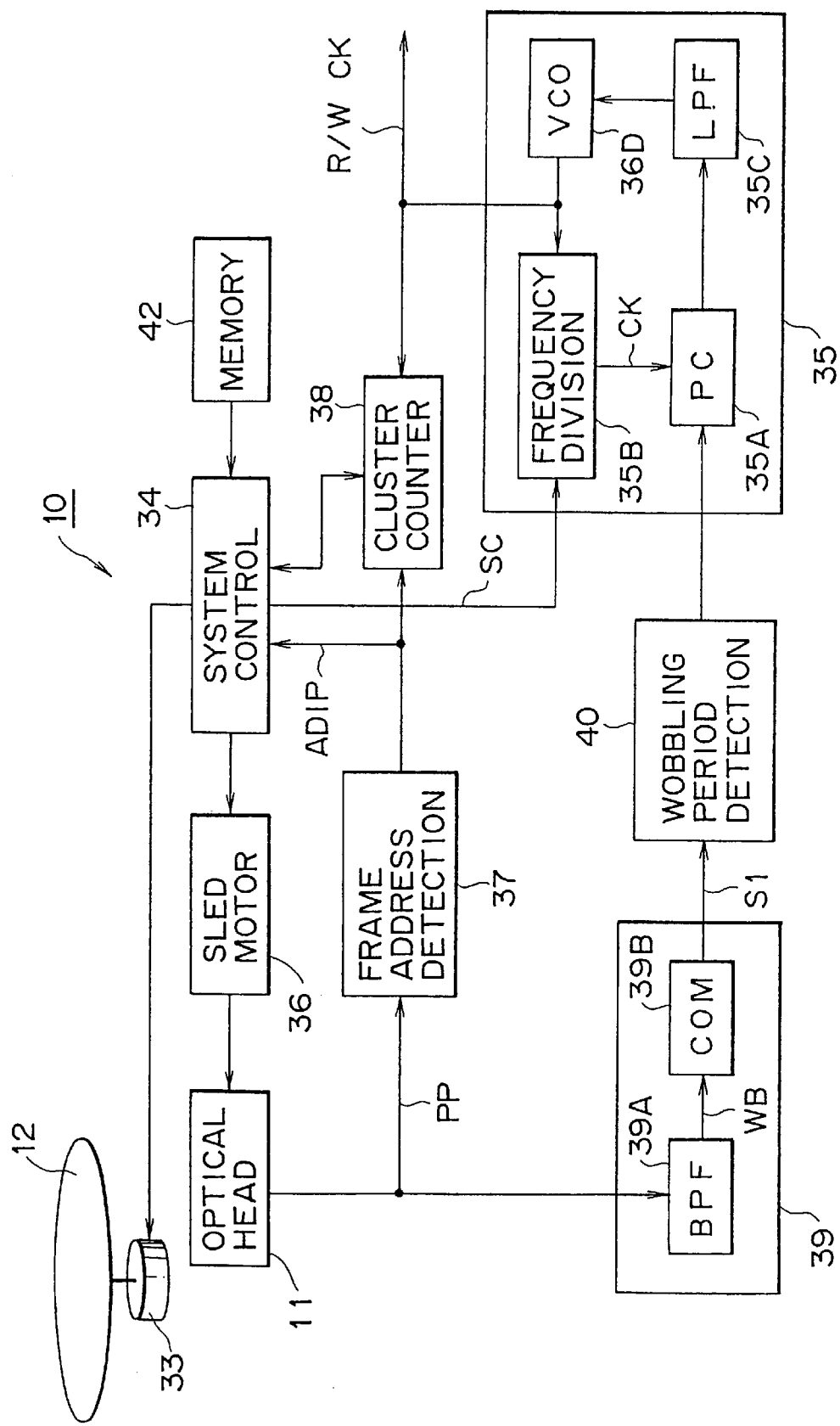
FIG. 6 is a block diagram showing a processing system for the wobble signal generated by the optical disc apparatus for accessing an optical disc manufactured by the mastering apparatus of FIG. 1.

FIG. 6 is a block diagram showing the wobble signal processing system in the optical disc apparatus for accessing the optical disc. In the optical disc apparatus 10, the optical disc 12 is illuminated with the laser beam from the optical head 11 and a reflected beam is received.

Figure 7:
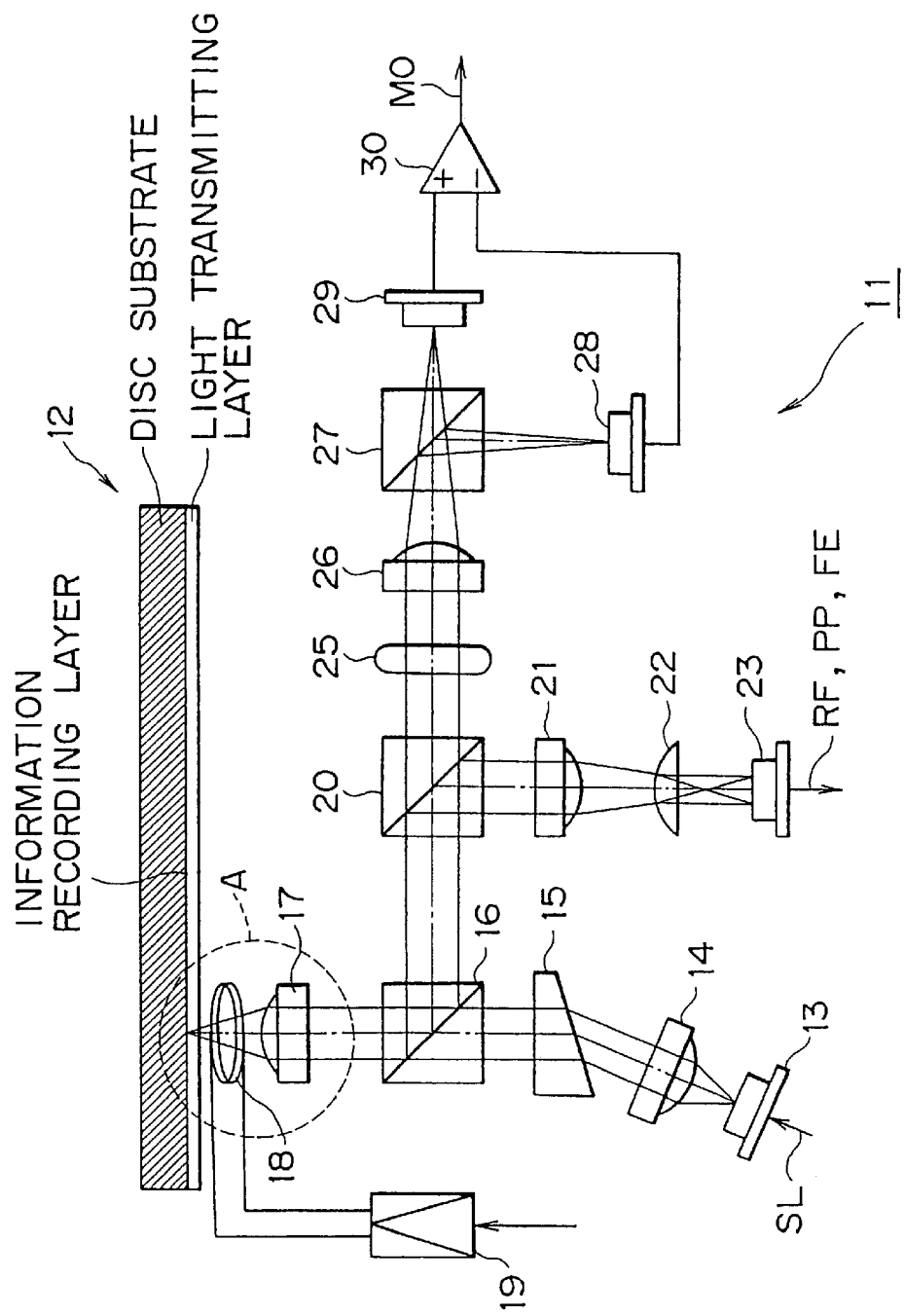
FIG. 7 is a schematic diagram showing an optical head of the optical disc apparatus of FIG. 6.

Namely, as shown in FIG. 7, in the optical head 11, a semiconductor laser 13 is driven by a predetermined drive signal SL to emit the laser beam of the wavelength of 650 [nm]. In this case, the semiconductor laser 13 emits the laser beam with the constant amount of light during the reproducing operation. Meanwhile, during the recording operation, the semiconductor laser 13 emits the laser beam by intermittently increasing the amount of light. In this embodiment, with the increase in the laser beam, a pit or a mark can be formed in the information recording apparatus of the optical disc 12.

A subsequent collimator lens 14 converts the laser beam emitted from the semiconductor laser 13 to the parallel beam; and a shaping lens 15 compensates for astigmatism of this laser beam and then emits the laser beam to the objective lens 17 passing through a beam splitter 16.

The objective lens 17 focuses the laser beam to the information recording surface of the optical disc 12 and receives the reflected light. Thereby, in the optical disc apparatus 10, when the optical disc 12 is prepared for reproduction, data recorded on the optical disc 12 can be reproduced depending on a change in the amount of reflected light. Moreover, when the optical disc 12 is of the phase changing type, the predetermined data is recorded by changing the local crystal structure of the laser beam illuminating position, and the recorded data can be reproduced depending on the change in the amount of reflected light.

When the optical disc 12 is of the additional recording type disc, the desired data is recorded by breaking the local laser beam illuminating position, and the recorded data can be reproduced depending on a change in the amount of reflected light. Meanwhile, when the optical disc 12 is of the magneto-optical type, a modulation coil arranged near the objective lens 17 is driven by the predetermined drive circuit 19; and the predetermined modulation magnetic field is applied to the laser beam illuminating position to record the desired data through application of the thermal magnetic recording method, and also to reproduce the recorded data by detecting change of the polarizing plane of the reflected light.

The beam splitter 16 passes the incident laser beam from the shaping lens 15 and supplies the beam to the objective lens 17, while reflecting the incident light from the objective lens 17 to isolate the optical path and to emit the beam to the beam splitter 20.

The beam splitter 20 transmits and reflects the light to provide the returned light as the isolated two optical fluxes.

The lens 21 receives the light reflected by the beam splitter 20 and converts the light beam to optical flux. A cylindrical lens 22 adds astigmatism to the light beam emitted from the lens 21; and a photodetector 23 receives the light beam emitted from the cylindrical lens 22.

The photodetector 23 divides the light receiving surface into predetermined shapes to output the light receiving result to the divided light receiving surfaces. The photodetector 23 executes the addition and subtraction in the matrix circuit after the current/voltage conversion of the light receiving result at each light receiving surface with the current/voltage conversion circuit (not illustrated), to detect the reproduced signal RF which changes signal level depending on the amount of light of the returned light beam, the push-pull signal PP which changes signal level depending on displacement of the laser beam illuminating position for the groove or pit stream and the focus error signal FE which changes signal level depending on the amount of defocusing.

Meanwhile, a ½-wavelength plate 25 receives the returned light beam having passed the beam splitter 20 and changes the polarizing plane of this returned light beam to supply the light from the polarizing plane suitable for isolation of the light beam at the polarized beam splitter 27 as explained later. The lens 26 converts the returned light beam emitted from the ½-wavelength plate 25 to the converged optical flux. The polarized beam splitter 27 receives this light beam, reflects the predetermined polarized element and transmits the remaining part, thereby isolating the returned light beam into two optical fluxes which complementary change the amount of light depending on the polarizing plane.

The photodetectors 28 and 29 respectively receive two optical fluxes isolated by the polarized beam splitter 27 and output the light receiving result which changes signal level depending on the amount of light received. A differential amplifier 30 receives the results of the two photodetectors 28 and 29 via the current/voltage conversion circuit and obtains the differential amplification result to output the reproduced signal MO which changes signal level depending on the polarizing plane of the returned light beam.

Hence, the optical head 11 can record the predetermined data to or reproduce the recorded data from the various types of optical discs.

Figure 8:
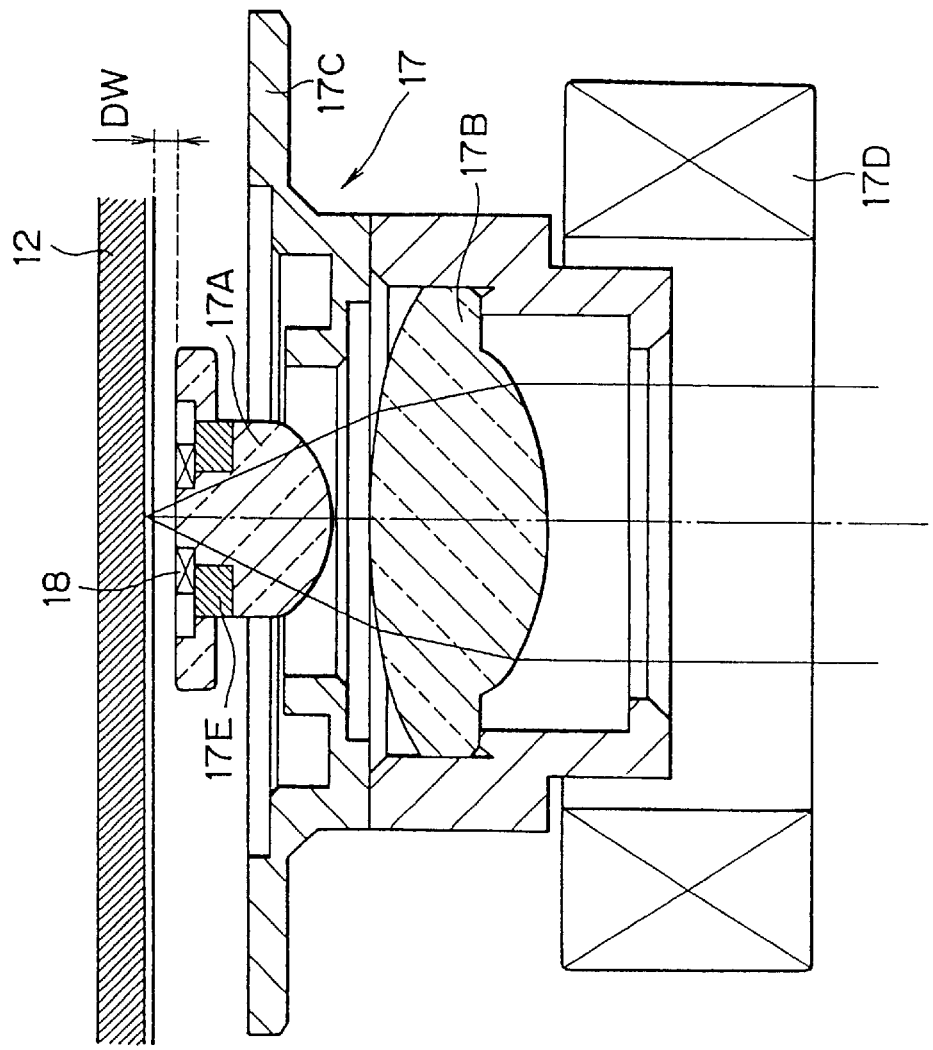
FIG. 8 is a cross-sectional view showing a peripheral structure of an objective lens of the optical head of FIG. 7.

FIG. 8 is a cross-sectional view showing the peripheral structure of the objective lens 17 of the optical head 11. The objective lens 17 is formed of a first lens 17A and a second lens 17B. Both first lens 17A and second lens 17B are formed of a non-spherical plastic lens and are integrally held to the predetermined holding member 17C so that it can be moved horizontally or vertically with respect to (the drawing) by means of a drive actuator 17D. Therefore, the optical disc apparatus 10 integrally moves the first lens 17A and second lens 17B to realize tracking and focusing control.

Moreover, in regard to the first lens 17A and second lens 173, the second lens 17B provided in the incident side of the laser beam is formed with a comparatively large diameter, while the first lens 17A provided in the side of optical disc 12 is formed with a smaller diameter; and each focusing distance and interval are set to provide the overall numerical aperture 0.78 for the objective lens 17.

Accordingly, the objective lens 17 satisfies the following formula. Here, $\lambda$ is wavelength of laser beam; NA is numerical aperture of the objective lens 17; t is thickness of the light transmitting layer of optical disc 12 and $\Delta t$ is fluctuation of t. Moreover, $\theta$ is skew margin of the optical disc 12.

$$\theta \leq \pm 84.115 \times (\lambda/mA^3/t) \quad (2)$$

$$\Delta \leq \pm 5.26 \times (\lambda/MA^4) \, [\mu m] \quad (3)$$

Here, the formula (2) indicates a relationship between skew margin $\theta$ for assuring stable access to the optical disc and the optical system (Japanese Patent Application Laid-Open No. HEI 3-225650) and it is usually set to about 0.6 in the compact disc as currently mass-produced. In the case of DVD, the skew margin $\theta$ is set to 0.4. Thereby, in this embodiment, the stable access for practical use can be made to the optical disc 12 even when thickness of the light transmitting layer is set to 0.1 [mm] and the numerical aperture NA of the optical system is set to a large value.

In addition, the formula (3) indicates the fluctuation of thickness t of the light transmitting layer in the optical system. The constant 0.526 has been calculated with reference to the compact disc and $\Delta t$ is $\pm 100$ [$\mu m$] in the case of compact disc or $\pm 30$ [$\mu m$] in the case of DVD. Therefore, in the optical disc apparatus 10, even if thickness t of the light transmitting layer varies, stable access can be made to the optical disc 12.

The optical head 11 satisfies the following formula by illuminating the optical disc 12 with the laser beam having the wavelength 650 [nm] via the optical system having the numerical aperture 0.78.

$$4.7 \times [(0.65/0.60) \times (Na/\lambda)]^2 \qquad (4)$$

Here, 4.7 is a recording capacity (in GB) of DVD; and 0.65 and 0.6 are wavelength of the laser beam in DVD and numerical aperture number of the optical system, respectively. Thereby, in the optical head 11, data is processed in the same format as DVD to assure the recording capacity of about 8 [GB].

In the objective lens 17 formed as explained above, the first lens 17A is at the side of the optical disc 12 being held at the working distance DW as required depending on the aperture number. In this embodiment, the working distance DW is set to about 560 [nm] by selecting appropriate characteristics and arrangement of the first lens 17A and second lens 17B. The optical head 11 can set allowable deviation between lens surfaces of the objective lens 17, allowable surface angle and radius of curvature of the lens to a proper range assuring mass-production thereof for practical use. Moreover the optical head 11 can be reduced in size and effectively avoid possible collision with the optical disc.

Namely, in the optical head, when the numerical aperture is increased while maintaining the laser beam of the same diameter, the objective lens must be arranged near the information recording surface of the optical disc. When the optical head is arranged in such a way as to assure sufficient distance (space) for the optical disc, the beam diameter of laser beam must be increased significantly. Meanwhile, when the beam diameter of the laser beam is considered, a practical upper limit value is set to about 4.5 [mm] which is almost equal to that for DVD.

On the other hand, when the optical head is arranged near the optical disc, the beam diameter is reduced in such arrangement, and the optical system is reduced in size; the manufacturing accuracy and arrangement precision of the objective lens can be improved, however the probability for collision between the optical disc and optical head is raised. Therefore, in this embodiment, the working distance DW is set to about 560 [$\mu$m] to satisfy the conditions explained above.

The lens surface on the side of the optical disc 12 of the first lens 17A is flat. Thereby, the focus control can be performed reliably and even if the optical disc 12 is skewed; it does not collide with the surface of the light transmitting layer.

In addition, the first objective lens 17 is reduced in diameter, step-by-step, on the side of the optical disc 12; and the lens surface on the side of the optical disc 12 can be formed as small in diameter as the laser beam guided to the optical disc 12.

A modulation coil 18 is arranged to surround the end part of the first lens 17 and to become almost flat with the lens surface of the first lens 17A at the side surface in the optical disc 12. Thereby, the modulation coil 18 is arranged to as close as possible to the optical disc 12 within the range while not projecting from the lens surface of the first lens 17A. As a result, the modulation magnetic field can be impressed effectively onto the laser beam radiating position.

Moreover, in the modulation coil 18, rise in temperature is reduced by a heat radiating plate 17E arranged at the side of the first lens 17B to surround the first leans 17A. Various characteristic changes due to temperature rise can be controlled within the range which is sufficient for practical use.

In the optical disc apparatus 10 (FIG. 6), the spindle motor 33 rotates the optical disc 12 under the control of the system control circuit 34. In this case, the spindle motor 33 rotates the optical disc 12 in such a manner that the write/read clock R/W CK generated in the PLL circuit 35 becomes constant in frequency and the disc 12 is rotated by the so-called CAV (Zone Constant Angular Velocity) method.

A sled motor 36 moves, in the optical disc apparatus 10, the optical head 11 in the radial direction of the optical disc 12 under the control of the system control circuit 34 for the seeking function.

A frame address detecting circuit 37 receives a push-pull signal PP output from the optical head 11 and extracts the wobble signal using a band-pass filter. Moreover, the frame address detecting circuit 37 detects phase change of the wobble signal, demodulates the wobble data ADIP by executing the predetermined signal process and then outputs the demodulated wobble data ADIP to the system control circuit 34 and cluster counter 38. The optical disc apparatus 10 roughly identifies, in the system control circuit 34, the laser beam radiating position depending on the wobble data ADIP and also checks the timing of the frame synchronization in the cluster counter 38.

In addition, the frame address detecting circuit 37 detects, when outputting the wobble data ADIP, an error with the error detection code CRC assigned to each wobble data frame and then outputs the wobble data ADIP which is judged as correct data after stripping the error detection code and reserve bit.

The wobble signal detecting circuit 39 supplies the push-pull signal PP output from the optical head 11 to the band-pass filter 39A and extracts the wobble signal WB. Moreover, the wobble signal detecting circuit 39 converts the wobble signal WB to a binary signal with reference to 0 level in the subsequent comparing circuit (COM) 39B and extracts the edge information of the wobble signal WB.

A wobbling period detecting circuit 40 receives the converted binary signal S1 and determines whether the wobble signal WB is changed in the correct period or not by judging the timing of the corresponding edge with reference to the timing of each edge of the binary signal S1. Moreover, the wobbling period detecting circuit 40 selectively outputs the edge information, which is judged to have the correct period, to the PLL circuit 35. Thereby, the wobbling period detecting circuit 40 prevents variation of the clock CK due to dust, etc. deposited on the optical disc 12.

Figure 9:
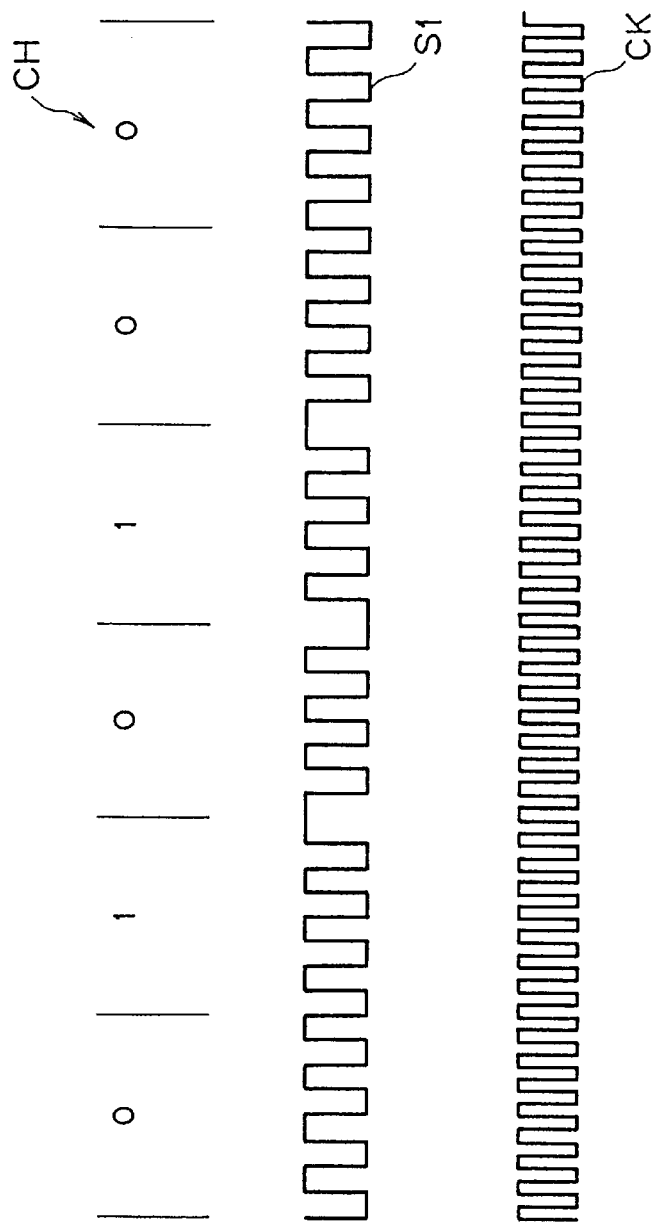
FIG. 9A and FIG. 9B show signal waveforms for explaining how a clock signal is generated by the optical disc apparatus of FIG. 6.

The PLL circuit 35 supplies the binary signal, output from the wobbling period detecting circuit 40, to a phase comparing circuit (PC) 35A to compare with the clock CK output from the frequency dividing circuit 35B. As shown in FIGS. 9A–9B, in the frequency dividing circuit 35B, the clock CK (FIG. 9B) having the frequency two times the frequency of the binary signal S1 (FIG. 9A) is output by the system control circuit 34. For the wobble signal WB, each edge holds the correct phase information by generating the phase-modulated wobble signal in the mastering apparatus 1.

Accordingly, in the PLL circuit 35, a low frequency element of the phase comparison result is extracted by the low-pass filter (LPF) 35C, and the oscillation frequency of the voltage controlled type oscillating circuit (VCO) 36D is controlled by the low frequency element. Moreover, an oscillation output of the voltage controlled oscillator 36D is divided by the frequency dividing circuit 35B to generate the clock CK having higher accuracy.

In the PLL circuit 35, the frequency dividing circuit 35B is set so that a frequency dividing ratio is sequentially increased step by step depending on the system control circuit 34 as the laser beam radiating position is displaced to the outer circumference of the optical disc 12. The PLL circuit 35 sequentially increases, step by step, the frequency of oscillation output of the voltage controlled oscillation circuit 36D for the wobble signal WB, as the laser beam illuminating position is displaced to the outer circumference of the optical disc 12 to output the oscillation output as the read/write clock R/W CK.

In the optical disc apparatus 10, the optical disc 12 is driven to rotate so that the read/write clock R/W CK has constant frequency. Moreover, the predetermined data is recorded with reference to this read/write clock R/W CK. Thereby, the line recording density is never changed to a large extent in the outer and inner circumference and the line recording density can be increased.

A cluster counter 38 identifies the laser beam illuminating position with higher accuracy with reference to the read/write clock R/W CK by counting the read/write clock R/W CK with reference to the detection result of the frame address detecting circuit 37. The cluster counter 38 outputs a cluster start pulse to the system control circuit 34 depending on the count result. The cluster is a unit of data recording and reproduction for the optical disc 12, and the cluster start pulse indicates the timing for starting the cluster.

In this process, the cluster counter 38 interpolates the wobble data ADIP and outputs the cluster start pulse by a synchronous process with reference to the count value of the read/write clock R/W CK, for example, when the wobble data ADIP is not detected by the frame address detecting circuit 37 due to dust on the optical disc surface.

The system control circuit 34 includes a computer for controlling overall operations of the optical disc apparatus 10 in order to control the operations of the sled motor 36 depending on the wobble data ADIP which are sequentially input; and to control entire operations through control of external devices depending on the laser beam illuminating position.

In this processing, the system control circuit 34 switches the frequency dividing ratio of the frequency dividing circuit 35B with the frequency dividing ratio data stored in the memory 42 depending on the laser beam illuminating position with reference to the track number.

Figure 10:
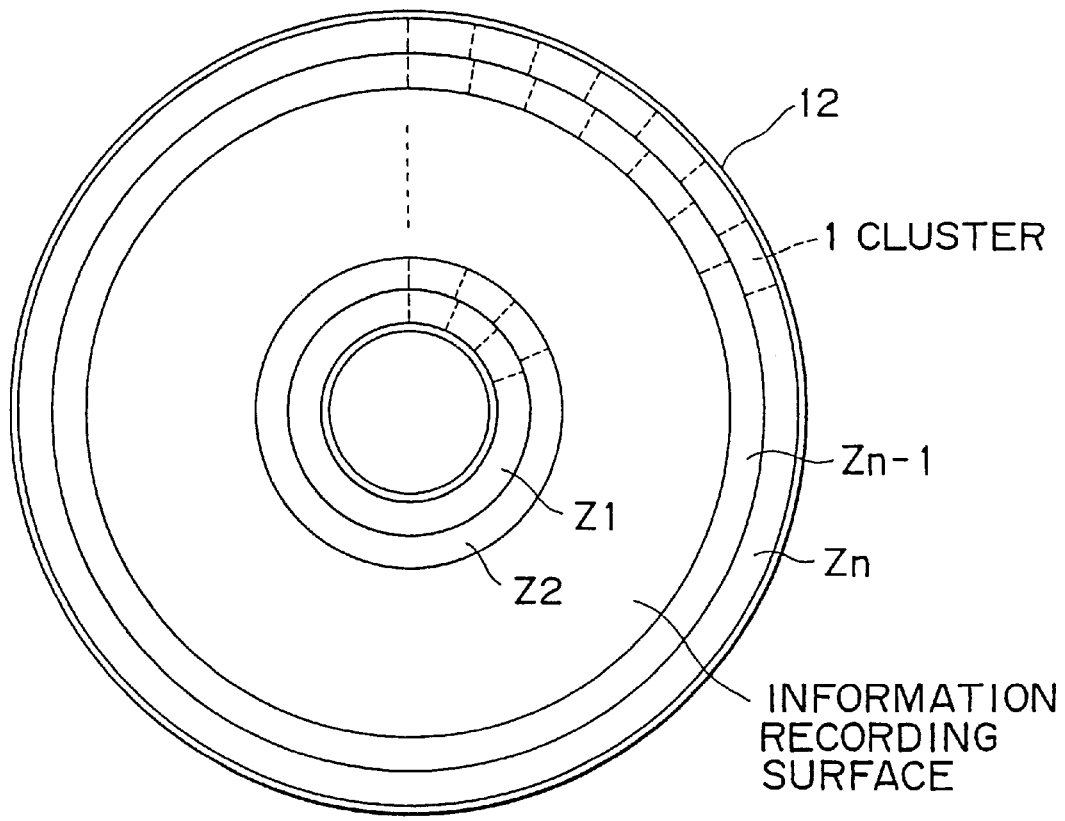
FIG. 10 is a plan view for explaining the drive of an optical disc by the optical disc apparatus of FIG. 6.

As shown in FIG. 10, the system control circuit 34 concentrically divides the information recording surface of the optical disc 12 into a plurality of zones Z0, Z1 ..., Zn−1, Zn; sequentially reduces, step-by-step, the rotating velocity of the optical disc toward the zones in the outer circumference from the zones in the inner circumference; and sets the identical recording density to the inner and outer circumference portions.

Moreover, each zone is radially divided, and data of one cluster is assigned to each divided area by executing control for read and write operation depending on the cluster start pulse output from the cluster counter 38. Thereby, the system control circuit 34 sequentially increases the number of clusters of each zone toward the zones in the outer circumference from the zones in the inner circumference.

In the optical disc apparatus 1, the area with the radius 24 [mm] to 58 [mm] is divided into 81 zones where 840 tracks are assigned to each zone. Moreover, at the zone of the inner most circumference, one track is radially divided to form 964 frames. At the zone of the outer circumference, each track is divided so that the number of frames can be increased sequentially in units of 16 frames. The optical disc apparatus 1 assigns the data of one cluster to the continuous 420 frames, formed as explained above, for recording purposes.

Moreover, the system control circuit 34 issues an instruction to the tracking servo circuit (not illustrated), for switching the moving direction of the objective lens 17 for polarity of the tracking error signal; and controls the scanning of the laser beam between the groove and the land between the grooves. Thereby, the so-called land/groove recording can be realized in the optical disc apparatus 10.

Figure 11:
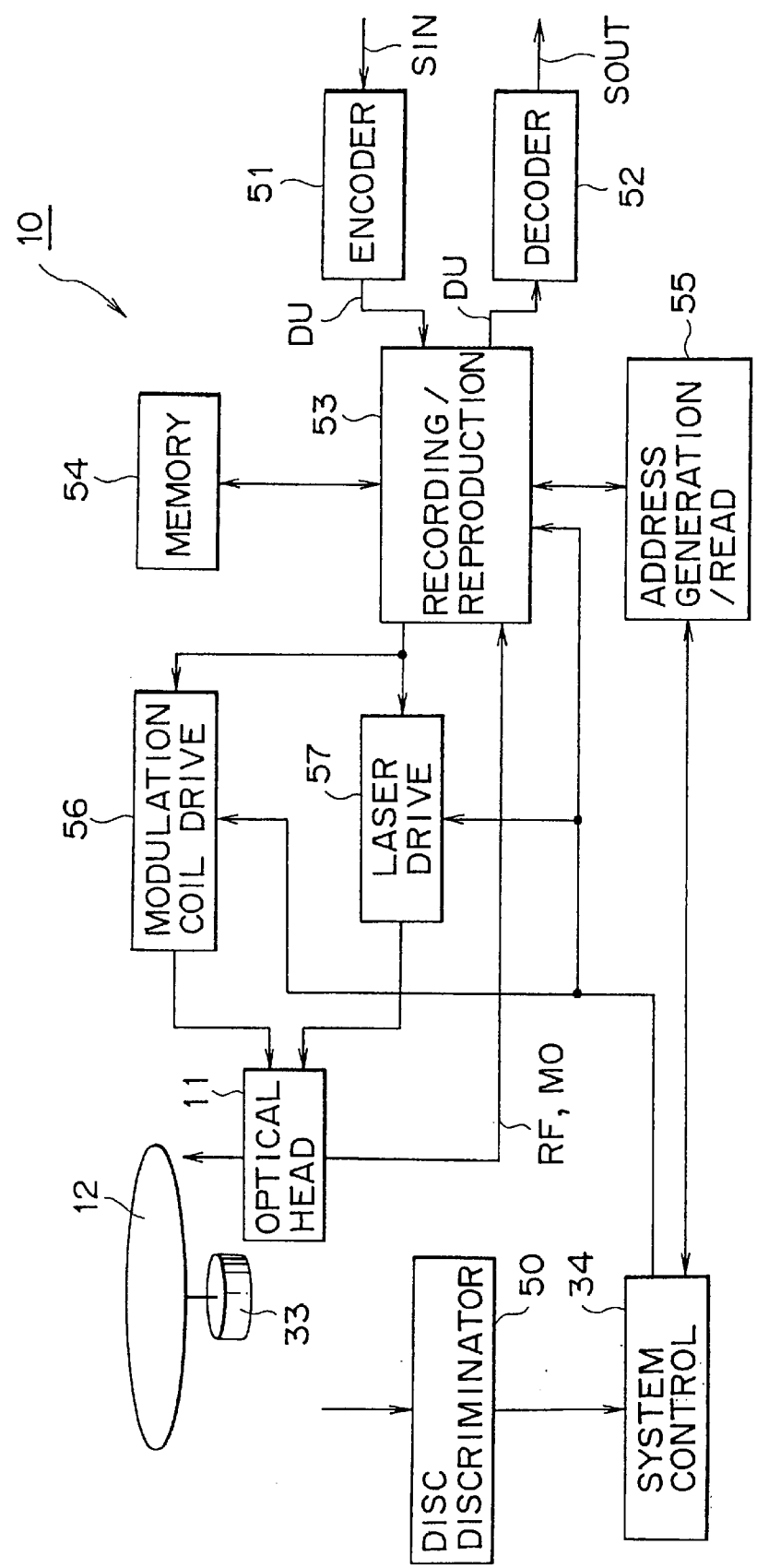
FIG. 11 is a block diagram showing a data processing system of the optical disc apparatus of FIG. 6.

FIG. 11 is a block diagram showing a recording/reproducing system of the optical disc apparatus 10. In the optical disc apparatus 10, a disc discriminator 50 discriminates a type of optical disc, for example, from a recess formed on the cartridge and then outputs the discrimination signal to the system control circuit 34. The optical disc apparatus 10 switches operation of the recording/reproducing operation system depending on the type of the loaded optical disc 12.

An encoder 51 inputs, in the recording and editing operations, an input signal SIN comparing a video signal and audio signal from an external apparatus; and compresses data depending on the specified format of MPEG (Moving Picture Experts Group) after the analog/digital conversion of the video signal and audio signal. Moreover, the data-compressed video and audio data are multiplexed by the time division multiplexing method to generate the user data DU.

The decoder 52 expands, conversely to the encoder 51, the user data DU output by the recording/reproducing circuit 53, depending on the specified format of MPEG during the reproducing and editing operations to generate the digital video signal and audio signal. The digital video and audio signals are then converted to the analog signal SOUT as the output signals.

The recording/reproducing circuit 53 accumulates, during the recording and editing operations, the user data DU output from the encoder 51 to the memory 54 and processes the user data in units of predetermined blocks for recording to the optical disc 12. Namely, the recording/ reproducing circuit 53 sequentially forms the blocks of the user data DU, as shown in FIG. 12, in units of 2048 bytes, and adds the sector address and error detecting code of 16 bytes to each block. The recording/reproducing circuit 53 forms the sector data block with 2048 bytes+16 bytes. The sector address is the address data of the current sector data block, and the error detection code is an error detecting code of the current sector address.

Moreover, the recording/reproducing circuit 53 forms, as shown in FIG. 13, the ECC data block (182 bytes×208 bytes) from 16 sector data blocks. Namely, the recording/reproducing circuit 53 sequentially arranges 16 sector data blocks of 2048 bytes×16 bytes in the sequence of the cluster scanning in units of 172 bytes to generate an error correction code (PI) consisting of internal code in the horizontal direction. Moreover, the error correction code (PO) consisting of external code is generated in the vertical direction.

Figure 14:
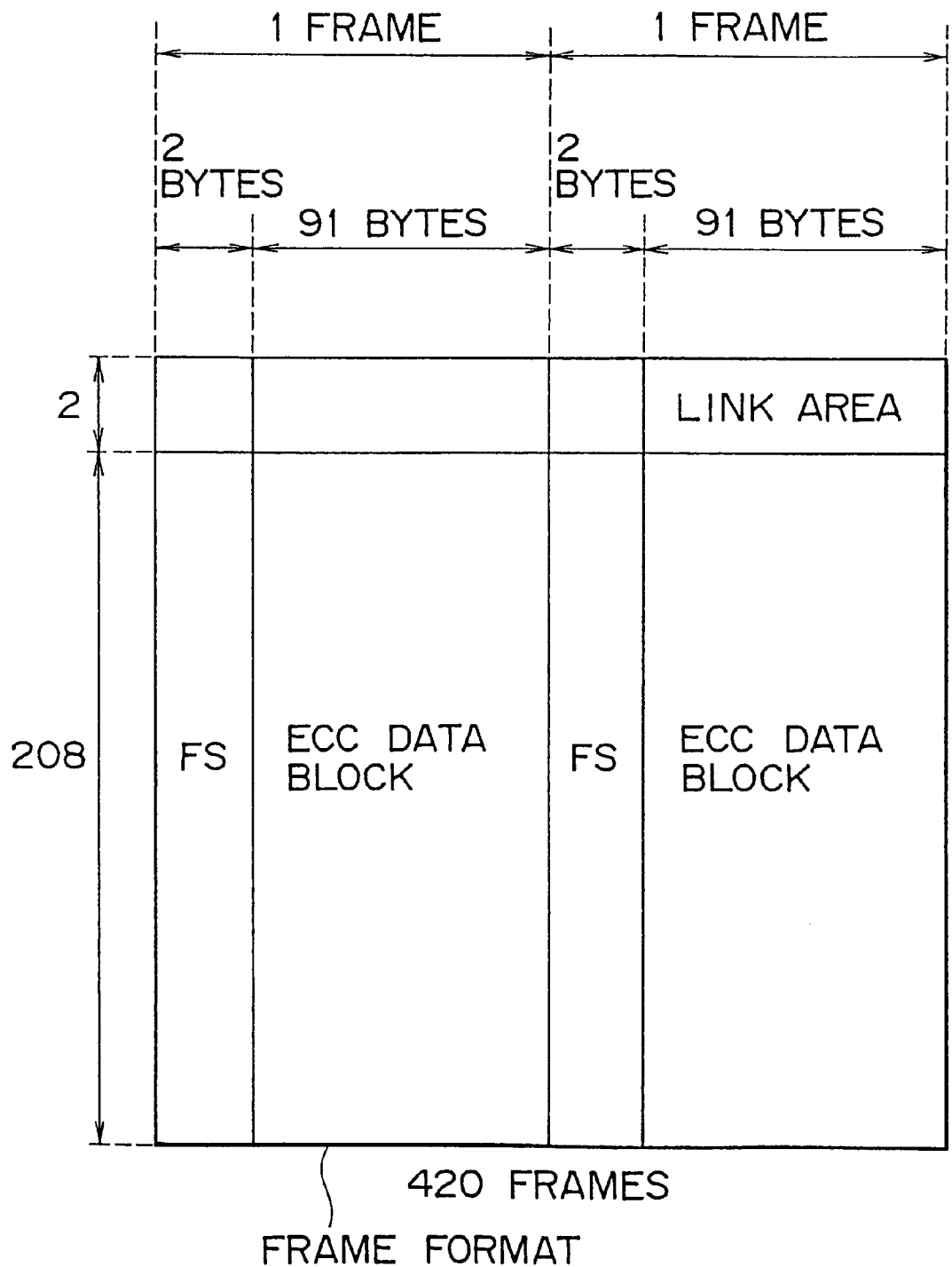
FIG. 14 is a diagram for explaining a frame format in the optical disc apparatus of FIG. 11.

The recording/reproducing circuit 53 forms a frame structure shown in FIG. 14 by an interleaving process of the ECC block. Namely, the recording/reproducing circuit 53 assigns the frame synchronization signal (FS) of 2 bytes to every 91 bytes of the ECC data block of 182 bytes×208 bytes and forms 208 frames with one ECC data block. The frame for a link of 2×2 frames is assigned for 208 frames. Thereby, the recording/reproducing circuit 53 forms data of one cluster by the frame structure shown in FIG. 14. The frame shown in FIG. 14 corresponds to the frame described in FIG. 10.

Figure 15:
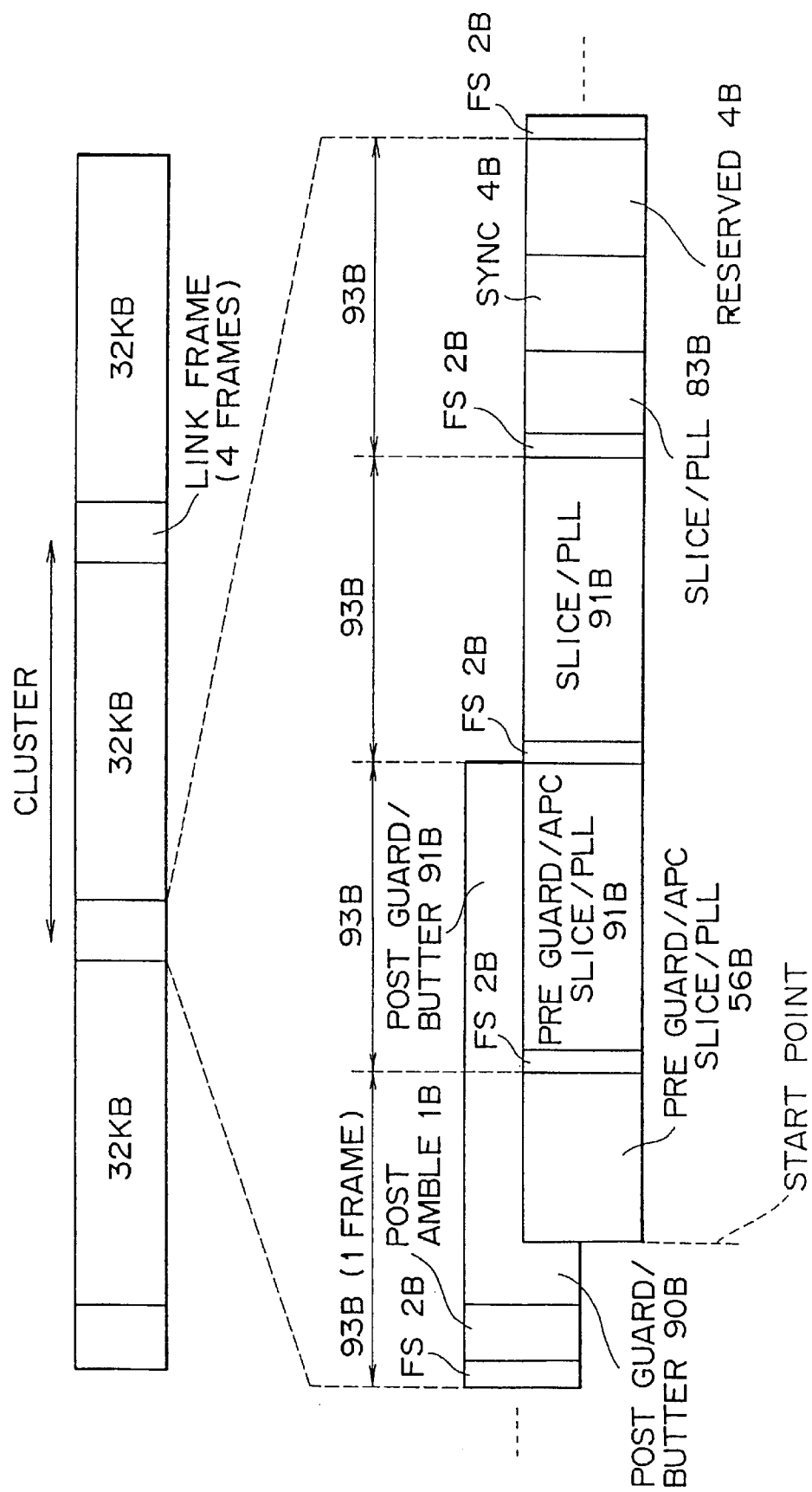
FIG. 15 is a diagram for explaining cluster in the optical disc apparatus of FIG. 11.

The frame for the link among these frames is used as a buffer of the adjacent clusters at the time of recording the data to the optical disc 12 in units of cluster. Namely, as shown in FIG. 15, the recording/reproducing circuit 53 sequentially records the data of 56 bytes and three frames as the link to the optical disc 12 and thereafter sequentially records the frames consisting of the ECC block. The leading 56 bytes and subsequent 91 bytes sandwiching therebetween the frame synchronization signal are used to improve the overwrite cycle of the recording area by suppressing fluidity of the recording material; and adjust the amount of laser beam (pre guard/APC) (APC: Automatic Power Control) when the phase changing medium is used as the recording medium. Thereafter, the region for adjusting slice level during the reproducing operation and the region (Slice/PLL) for PLL synchronization are sequentially assigned, sandwiching therebetween the frame synchronization signal (FS). The 91 bytes for adjusting the laser beam are also used for adjustment of a slice level and PLL synchronization during the reproducing operation. Moreover, at the ending part of this leading side, the synchronization pattern (Sync) of 4 bytes and region for reserve (Reserved) are set.

At the ending part of the frame of the ECC block, postamble of one byte, post guard/buffer of 90 bytes and post/buffer of 91 bytes sandwiching therebetween the frame synchronization signal are assigned, following the frame synchronization signal (FS); and the clusters subsequently recorded are overlapped between these areas. The postamble is the area for adjusting mark length of the data and for setting the signal polarity to a predetermined value, while the post guard is the area for improving the overwrite cycle of the recording area by suppressing fluidity of the recording material by the overwrite operation. The buffer is the area for absorbing recording jitters due to eccentricity of the disk and recording sensitivity, etc.

The recording/reproducing circuit 53 outputs, during the recording operation, the modulated data by modulating the data into a format suitable for recording to the optical disc 12. In this case, the recording/reproducing circuit 53 modulates the data stream for recording to the optical disc by the (1,7)RLL modulation method, and executes the arithmetic operation for the data between the continuous bit streams. Moreover, at the time of outputting the data, data is intermittently output at the transfer speed higher than the user data DU (input from the encoder 51) by outputting the data in the data transfer speed of 11.08 [Mbps] after conversion to the user data DU. Thereby, the recording/reproducing circuit 53 can continuously record the user data without intermission, even if detracking occurs, by making use of the extra time of the intermittent recording of the user data DU.

When recording the data, the recording/reproducing circuit 53 outputs the modulated data with reference to the read/write clock R/W CK as explained in regard to FIG. 6, and starts to output the modulated data with reference to the timing detected by the cluster counter 38 under the control the system control circuit 34.

Moreover, the recording/reproducing circuit 53 amplifies, during the reproducing operation, the reproducing signal RF, MO (input from the optical head 11) and then converts this signal into a binary signal. With reference to this binary signal, the clock is generated from the reproducing signal RF, MO. Thereby, the reproduced clock corresponds to the read/write clock R/W CK. In addition, with reference to the reproduced clock, the binary signal is sequentially latched to detect the reproduced data. Thereby, the recording/reproducing circuit 53 executes setting of the slice level for conversion to binary form and pulling of the PLL circuit for clock regeneration in the link frame.

The recording/reproducing circuit 53 produces the decoded data by decoding the reproduced data by applying the method of PRML (Partial-Response Maximum-Likelihood). Moreover, the recording/reproducing circuit 53 executes the interleave process on this decoded data and thereafter executes the error correcting process to output it to the decoder 52.

In the DVD, the data of (1,7)PLL modulation is recorded in the shortest bit length of 0.4 [$\mu$m] and when the recording/reproducing system is formed within the same constraint as DVD only through conversion of the numerical aperture, the predetermined data can be recorded and reproduced in the shortest bit length of 0.3 [$\mu$m] and line recording density of 0.23 [$\mu$m/bit]. On the other hand, when the intersymbol interference is positively used by the PRML, a similar margin can be attained with the line recording density of 0.23 [$\mu$m/bit].

In this case, the recording/reproducing circuit 53 converts the data to the user data DU as in the case of the recording operation and intermittently reproduces data from the optical disc 12 in units of cluster with the data transfer speed of 11.08 [Mbps]; and then continuously outputs the reproduced user data to the decoder 52.

In the reproducing operation, the recording/reproducing circuit 53 selectively processes, when the optical disc 12 is a magneto-optical disc, the reproduced signal MO which changes signal level depending on the polarizing plane under the control of the system control circuit 34 to reproduce the user data DU. Moreover, when the optical disc 12 is the optical disc only for reproduction, additional writing type and phase changing type disc, the user data DU is reproduced by selectively processing the reproduced signal RF which changes signal level depending on the change in the amount of returned light beam. Moreover, even when the optical disc 12 is a magneto-optical disc, the user data DU is reproduced by selectively processing the reproduced signal PR when reproducing the read-in area in the inner circumference portion.

The address reading circuit 55 generates address data to be added to each sector data block during the recording operation and then outputs this data to the recording/reproducing circuit 53. Meanwhile, during the reproducing operation, the address data detected by the recording/reproducing circuit 53 is analyzed and is then supplied to the system control circuit 34.

The laser drive circuit 57 drives, during the writing operation, the semiconductor laser of the optical head 11 according to the timing synchronized with the read/write clock R/W CK under the control of the system control circuit 34 when the optical disc 12 is a magneto-optical disc, and intermittently increases the amount of the laser beam.

The laser drive circuit 57 intermittently increases, during the write operation, amount of laser beam when the optical disc 12 is the phase changing type or additional writing type disc under the control of the system control circuit 34; and records the user data DU to the optical disc 12.

The laser drive circuit 57 maintains, during the reading operation, the amount of laser beam at a constant level.

The modulation coil drive circuit 56 increases, when the optical disc 12 is a magneto-optical disc, the recording operation under the control of the system control circuit 34 and drives the modulation coil of the optical head 11 with the output data of the recording/reproducing circuit 53. The modulation coil drive circuit 56 applies the modulation magnetic field to the laser beam illuminating position where the mount of light beam increases intermittently to record the user data DU by the thermo-magnetic recording.

(1-2) Operation of Preferred Embodiments

In the above structure, the grooves are formed, in the mastering apparatus 1 (FIG. 2) with an interval of about 1.0 [$\mu$m] by rotating the original disc 2 with the constant angular velocity in order to emit the laser beam L in spiral form toward the outer circumference from the inner circumference; and this groove is followed by the wobble signal WB.

Moreover, in the mastering apparatus 1, the shape of a spot and the amount of light of the laser beam L are set so that the interval between the groove formed by exposure of the laser beam L and the adjacent groove becomes almost equal, and the optical disc is formed to enable the land/groove recording with reference to the groove. Moreover, in this case, the data capacity of 8 [GB] can be recorded by the land/groove recording method in the line recording density of about 0.21 [μm/bit] with reference to the groove.

In the mastering apparatus 1, the track number (track no) which is sequentially incremented for every rotation of the original disc 2 and the frame number (Sync no) which is sequentially and cyclically incremented for every 1/16 turn of the original disc 2 are generated; the predetermined wobble data frame (FIG. 2) is formed from the track number (track no) and frame number (Sync no); and the wobble data frame is input to the wobble signal generating circuit 7 as the wobble data ADIP via a the serial data stream.

The wobble data ADIP is biphase-modulated (FIGS. 3A–3F) in the biphase modulation circuit 7C. After, the addition of the synchronization pattern, the wobble data is phase-modulated, in the subsequent phase modulation circuit 7E, through assignment of the first and second carrier signals, showing a phase difference of 180 degrees, to each channel. Thereby, the wobble signal WB is produced by the single carrier frequency.

In the optical disc manufacturing process in this embodiment, the optical disc 12 is manufactured, through the predetermined processes, from the original disc 2 by this mastering apparatus 1. In the optical disc 12, the meandering period of the groove is set constant (through conversion to the rotating angle of the optical disc 12) at the inner circumference and the outer circumference. Moreover, numerous address data values are assigned to single turn of the optical disc 12 using the groove.

Moreover, the optical disc 12 is formed in such a manner that a light transmitting layer, which passes the light beam to the information recording surface, is formed, on the information recording surface, with the thickness of about 0.1 [mm]. Even when the optical system of higher numerical aperture transmits the laser beam via the light transmitting layer, the predetermined data can reliably be recorded/reproduced to/from the information recording surface by effectively avoiding the influence of skew. Moreover, the entire part of the information recording surface can be assigned for recording user data with reference to the groove.

In the optical disc apparatus 10, spindle control is executed with respect to the optical disc 12 with reference to the groove formed as explained above. In this case, very accurate clock CK with reference to the groove is generated in the PLL circuit 35, and the timing is detected by the cluster counter 38 (FIG. 6).

Namely, the optical disc 12 is illuminated with the laser beam, in the optical disc apparatus 10 (FIG. 6 to FIG. 3), of the wavelength of 650 [nm] via the objective lens 17 of the numerical aperture 0.7 of which working distance DW is set to 560 [μm]; and returned light is received by the optical head 11 to detect the reproduced signal RF which changes signal level depending on the amount of the returned light, reproduced signal MO which changes signal level depending on the polarizing plane of the returned light, the push-pull signal PP which changes signal level depending on displacement of the laser beam illuminating position for the groove or pit stream and the focus error signal FE which changes signal level depending on the amount of defocusing.

In the wobble signal detecting circuit 39, the wobble signal WB is extracted from the push-pull signal PP, and this wobble signal WE is converted to the binary signal to extract the edge information. In the subsequent PLL circuit 3, the binary signal S1 having this edge signal is phase-synchronized with the output signal CK of the frequency dividing circuit 35B having twice the frequency of the wobble signal WB to generate the read/write clock R/W CK.

In this case, since the wobble signal WE is generated by the carrier signal of the single frequency, the edge information obtained by the conversion to the binary signal has correct phase information. Accordingly, the highly accurate read/write clock R/W CK which is phase-synchronized with the edge information can be produced.

In addition, the read/write clock R/W CK is counted by the cluster counter 38 with reference to the timing of the frame synchronization detected by the frame address detecting circuit 37, and the write/read timing in the recording/reproducing circuit 53 (FIG. 11) can be set. In this case, since this timing is set with reference to the highly accurate clock R/W CK, the write timing, etc. can be set in the optical disc apparatus 10 by determining the laser beam illuminating position with a higher accuracy. Therefore, to when recording the user data at the higher density to the optical disc 12, the user data can be recorded using the information recording surface of the optical disc 12 at the higher density.

In this case, since the address data is sequentially recorded by dividing one circumference of the groove into 16, even when it is difficult to correctly detect the timing of frame synchronization in the frame address detecting circuit 37 due to dust, etc., the correct timing can be detected by counting up the clock R/W CK output from the PLL circuit 35 with the cluster counter 38. Thereby, even when the desired data is recorded or reproduced at higher density with the optical system having a higher numerical aperture, the data can reliably be recorded and reproduced.

In processing the wobble signal WB as explained above, a frequency dividing ratio of the frequency dividing circuit 35B is switched depending on the laser beam illuminating position in the PLL circuit 35, and the optical disc 12 is rotated by CLV.

In this case, since the groove is formed in such a manner that the tracing period is set constant at the inner circumference and outer circumference of the optical disc 12 through the conversion to the rotating angle, synchronization is quickly established in each zone to improve the access rate.

(1-3) Effect of the Embodiment

According to the structure described above, the wobble data comprising of the address data is recorded by following the groove and thereby the information recording surface of various types of optical discs can be assigned only for recording the user data. Therefore, since the wobble data can be recorded by following the groove, even if the track is formed at higher density and the light transmitting layer is thin, the wobble data can be demodulated with sufficiently higher reliability to reproduce the address recorded in the optical disc. Thereby, when recording information of higher density, the predetermined data can definitely be recorded or reproduced. In the case where the address data is recorded by the groove as described above, the present invention can be applied to the optical disc only for reproduction in which various types of information are recorded by the pit stream to assure compatibility.

In this case, the wobble signal can be generated with the single carrier frequency by phase-modulating the signal to be modulated by the biphase modulation of the wobble data and then providing the grove by assigning the signal to the wobble signal. Therefore, the laser beam illuminating position can be identified with higher accuracy by generating a high accuracy clock.

Since the wobble data is generated by adding an error detecting code, even when the signal level of the wobble signal is disturbed by dust, etc., the correct wobble data can be detected by the error detecting process; and the information recording surface can be used effectively, and the address recorded on the optical disc can reliably be detected.

Since wobble data is repeatedly assigned to a single turn of the groove, if it is difficult to correctly reproduce the wobble data, the wobble data can be interpolated at the time of reproduction by the synchronization process. Thereby, when the desired data is recorded with higher density, the address recorded on the optical disc can reliably be detected by effectively utilizing the information recording surface.

Since the tracing period of the groove converted to the rotating angle of the optical disc is identical in the inner circumference and the outer circumference portions, the access rate can be improved by accessing the optical disc under the condition that the angular velocity is constant in each zone.

The information recording surface of the optical disc can be used effectively by manufacturing an optical disc to carry out the land/groove recording and then executing the land/groove recording.

(2) Second Embodiment

FIG. 16 is a block diagram showing the mastering apparatus in the second embodiment of the present invention. In the manufacturing process of the optical disc in this embodiment, the original disc 2 is exposed to light by this mastering apparatus 61, and an optical disc is manufactured from the original disc 2. In the mastering apparatus 61, the structure identical to the mastering apparatus 1 explained with reference to FIG. 1 is designated by the like reference numerals and the same explanation is not repeated here.

In the mastering apparatus 61, the wobble signal generating circuit 67 generates and outputs a wobble signal WB from the wobble data ADIP, etc. In the wobble signal generating circuit 67, a generating circuit 67A generates and outputs a predetermined reference signal. In the mastering apparatus 61, one of the reference signals is used to control the spindle motor 3 in order to generate the wobble signal WB synchronized with rotation of the original disc 2.

A phase modulation circuit 67B phase-modulates the wobble data ADIP to generate a channel signal (ch) by assigning the first reference clock $\phi1$ synchronized with the phase of the reference signal and the second reference clock $\phi2$ which is different in the phase by 180 degrees from the first reference clock $\phi1$ depending on the logical level of the wobble data ADIP.

As shown in FIGS. 17A–17E, the phase-modulation circuit 67B assigns the first and second reference clocks $\phi1$ and $\phi2$ so that the even-number channels are formed in the former half and latter half of each bit (two channels respectively in this case) and the logical 1 period becomes equal to the logical 0 period in the former half and latter half of the timing corresponding to the bit center of the wobble data ADIP.

Namely, the phase-modulation circuit 67B assigns, when the wobble data ADIP is logical "1", one period of the second reference clock after assigning one period of the first reference clock and generates the channel signal (ch) in such a manner that the "0110" channel becomes continuous sequentially (FIG. 17 (A) to FIG. 17(D)).

When the wobble data ADIP is logical "0", after one period of the second reference clock is assigned, one period of the first reference clock is assigned and the channel signal (ch) is generated in such a manner that the "1001" channel becomes continuous sequentially.

The wobble signal generating circuit 67 inserts the synchronization pattern to the channel signal (ch) generated by the phase-modulation circuit 67B and then executes the frequency-modulation by the frequency modulation circuit 67C.

The frequency modulation circuit 67C performs the frequency modulation on the channel signal (ch) and then outputs the signal as the wobble signal WB. In this case, the frequency modulation circuit 67C assigns the sine wave signals of the frequency (n+d) and (n−d) to the logical "1" and "0" of the channel signals (ch) when the center frequency of the frequency modulation is defined as (n) in order to generate the wobble signal WB. Moreover, in this case, the sine wave signals of the frequency (n+d), (n−d) are respectively assigned to the channel signals (ch) in units of the 0.5 cycle to generate the wobble signal WB so that zero-cross can be attained at the timings (ts) and (tc) corresponding to the bit center and bit boundary of the wobble data ADIP, respectively.

Namely, when the first and second reference clocks $\phi1$ and $\phi2$ are assigned so that the even-number channels are formed in the former half and latter half of each bit at the timing (tc) corresponding to the bit center of the wobble data ADIP and the logical "1" period becomes equal to the logical "0" period in the former half and latter half, the number of the logical "1" channels is kept identical to the number of the logical "0" channels in the former and latter halves.

When the sine wave signals of the frequency (n−d) and (n+d) are assigned to this channel signal (ch) in units of 0.5 cycle, a change of phase for the carrier signal in the frequency (n) is canceled and the wobble signal WB can be generated in periods corresponding to the former and latter halves of each bit of the wobble data ADIP. Accordingly, the wobble signal WB can be generated in such a manner that zero-cross occurs at the timings (ts) and (tc) corresponding to the bit center and bit boundary of the wobble data ADIP, respectively.

Moreover, in this case, when the sine wave signals in the frequency (n−d) or (n+d) are assigned in units of 0.5 cycle, any one of the timings where the signal level of the wobble signal WB rises from 0 level or the timings where the signal level of the wobble signal WB falls to 0 level is completely maintained at the timings (ts) and (tc) corresponding to the bit center and bit boundary of the wobble data ADIP, respectively, to maintain the correct phase information of the carrier signal.

Figures 18A, 18B, 18C, 18D, 18E, 18F:
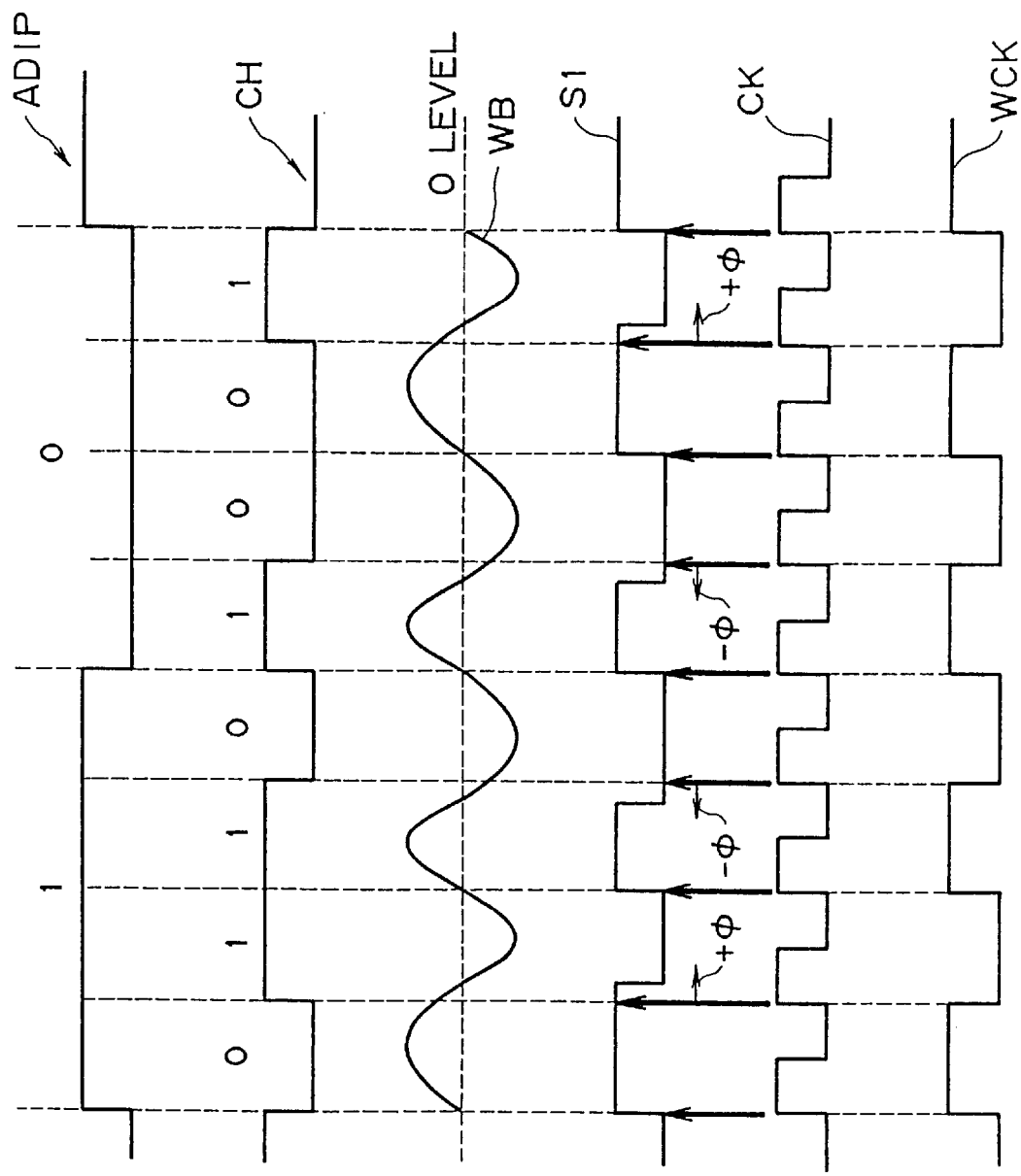
FIG. 18A to FIG. 18F show signal waveforms for explaining the processes of the wobble signals generated by the mastering apparatus of FIG. 16.

As shown in FIG. 18, when the wobble signal WB is converted to the binary signal with reference to 0 level, the binary signal S1 where the rising or falling edge is matched with the timing of the edge of the channel signal (ch) can be generated (FIG. 18(A) to FIG. 18(D)). Accordingly, the clock CK and wobble clock WCK are generated with reference to the timing of the edge having correct phase information in order to generate a highly accurate clock without variations in frequency and phase (FIG. 18(E) and FIG. 18(F)). Moreover, as shown by the arrow mark, since the phase differences +$\phi$ and −$\phi$ for the clock CK generated as explained above indicate the logical levels of the former half side and the latter half side of the channel signal (ch), the wobble data ADIP can also be decoded with reference to the phase differences +$\phi$ and −$\phi$.

Thereby, in the wobble signal generating circuit 67, the groove is followed with this wobble signal WB to generate the highly accurate clock.

In this embodiment, various optical discs can be manufactured from the original disc 2 as in the case of the first embodiment. Since the timing where the signal level of the wobble signal WB rises from 0 level or the timing where the signal level of the wobble signal WB falls to 0 level completely maintains the correct phase information of the carrier signal in the optical disc, the period in which the groove crosses the track center toward the outer circumference from the inner circumference or the period in which the groove crosses the track center toward the inner circumference from the outer circumference is kept constant; and such crossing timing is matched with the zero-cross timing of the carrier signal.

Figure 19:
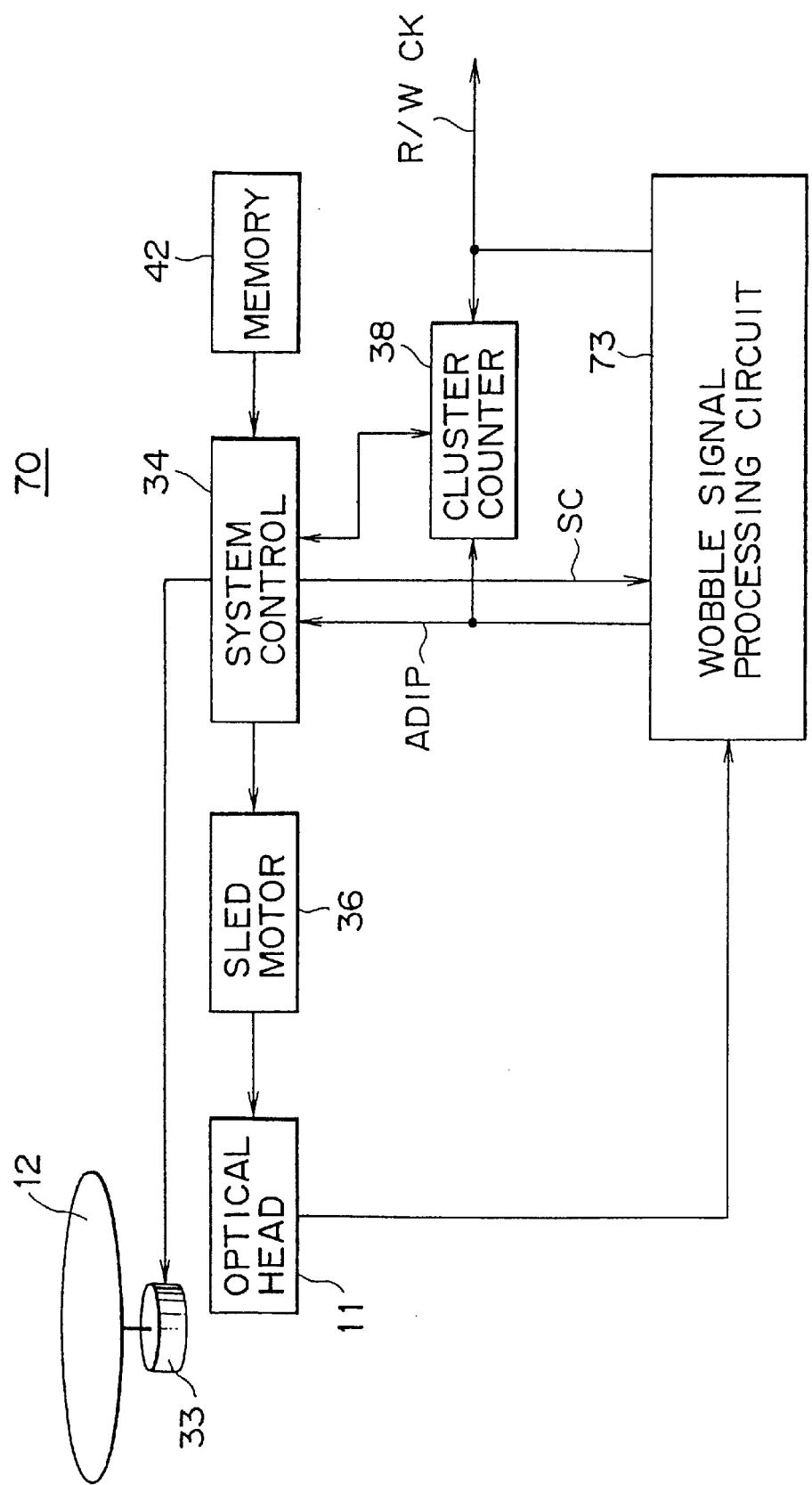
FIG. 19 is a block diagram showing the optical disc apparatus for accessing the optical disc manufactured by the mastering apparatus of FIG. 16.

FIG. 19 is a block diagram showing the optical disc apparatus in the second embodiment. In the optical disc apparatus 70, the structure identical to that of the optical disc apparatus explained above with reference to FIG. 6 and FIG. 11 is designated by the like reference numeral and the same explanation is not repeated here.

In the optical disc apparatus 70, the wobble signal processing circuit 73 extracts the wobble signal WB from the push-pull signal PP and processes this wobble signal WB to generate the wobble clock WCK, clock CK and read/write clock R/W CK. In addition, the wobble signal processing circuit 73 detects the wobble data ADIP from the wobble signal WB and then supplies it to the system control circuit 34.

Figure 20:
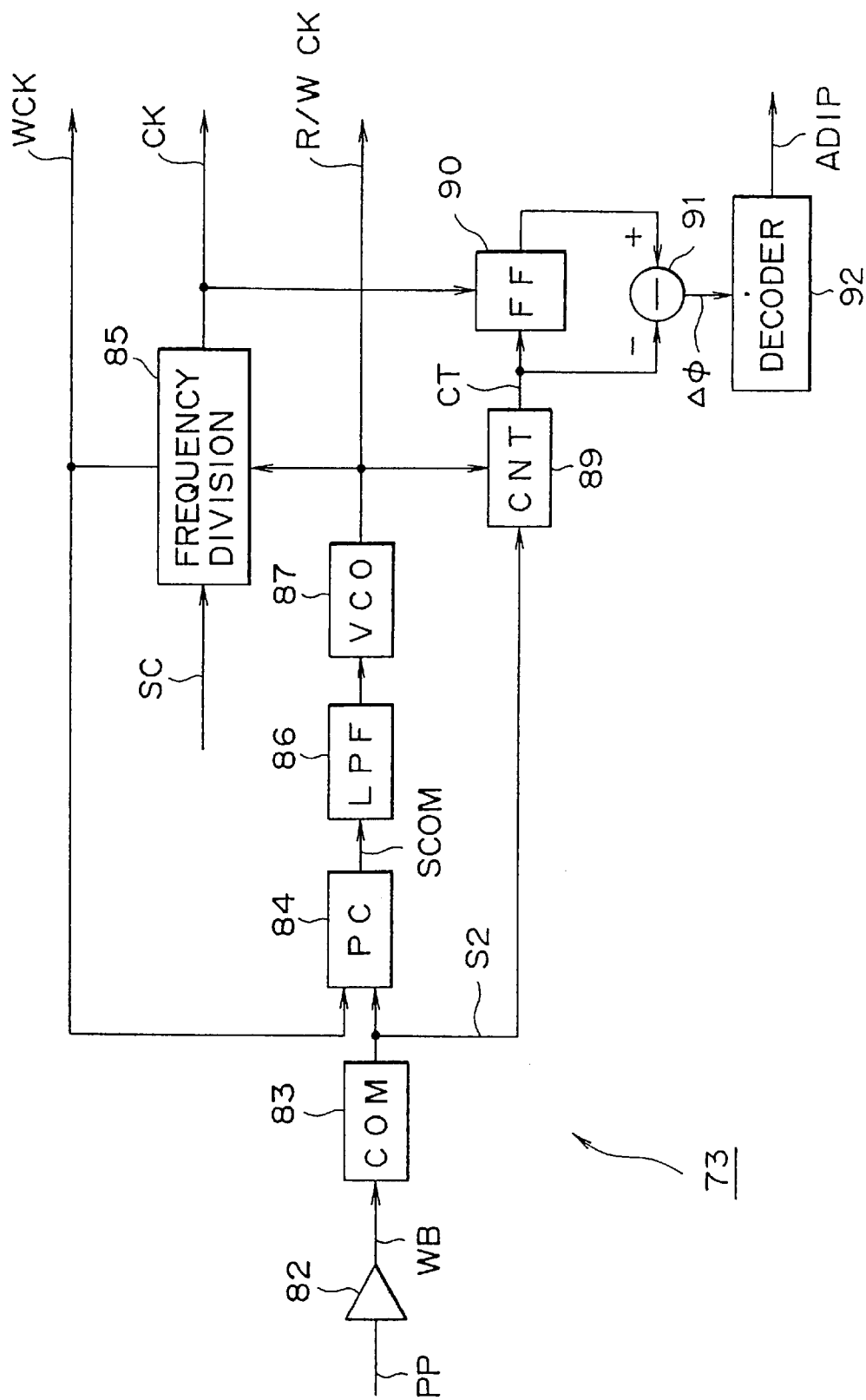
FIG. 20 is a block diagram showing a wobble signal processing circuit of the optical disc apparatus of FIG. 19.
Figures 22A, 22B, 22C, 22D, 22E, 22F, 22G, 22H:
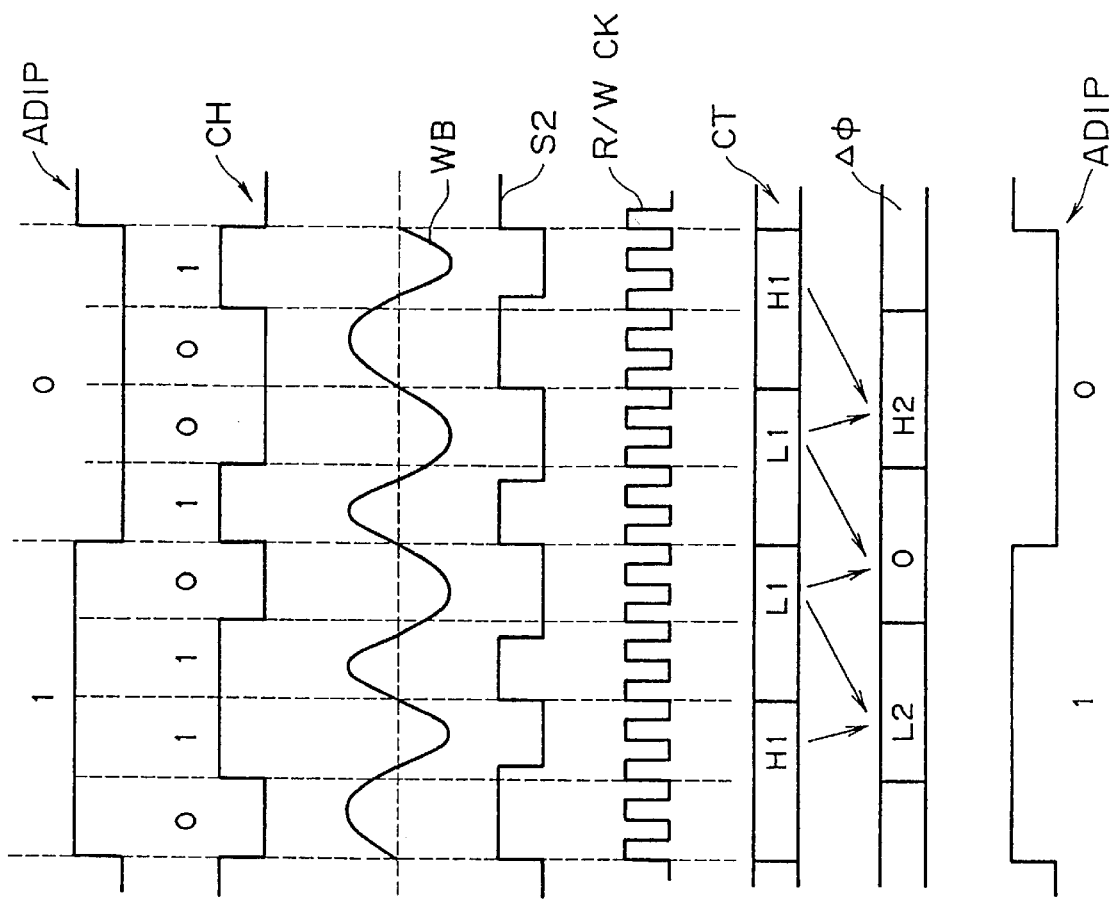
FIG. 22A to FIG. 22H show other signal waveforms in FIG. 21.
Figures 25A, 25B, 25C:
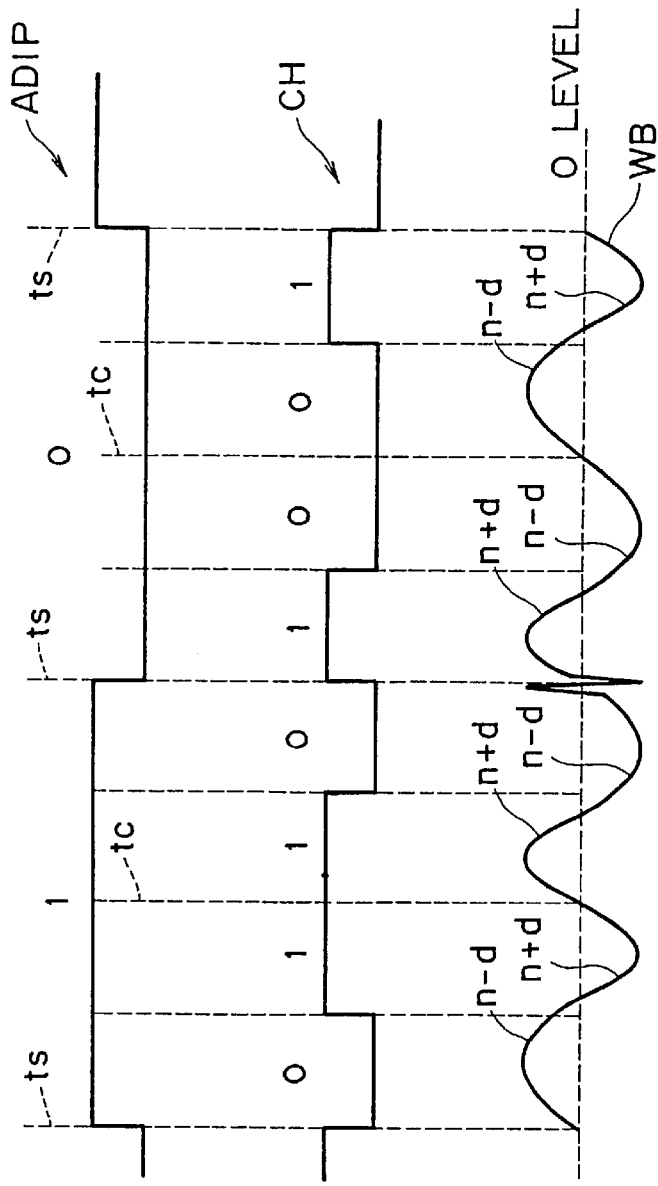
FIG. 25A to FIG. 25C show signal waveforms for explaining other embodiments where the reference signal having a short period is inserted into the wobble signal.

FIG. 20 is a block diagram showing the wobble signal processing circuit 73 in detail. The wobble signal processing circuit 73 amplifies the push-pull signal PP with the amplifying circuit 82 having a predetermined gain and extracts the wobble signal WB via a band-pass filter (not illustrated). As shown in FIGS. 21A–21I, the comparing circuit (COM) 83 converts this wobble signal WE to the binary signal with reference to 0 level to generate the binary signal S2; and detects the edge information from the wobble signal WB (FIG. 21(A) to FIG. 21(D)). This binary signal S2 has the correct phase information at any one of the rising or falling edges, and the phase information of the remaining edges has the information of the wobble data ADIP.

The phase comparing circuit (PC) 84 includes an exclusive OR circuit and compares the phase of the wobble clock WCK, output from the frequency dividing circuit 85, with that of the wobble signal WE to output the phase comparison result SCOM (FIG. 21(D) to FIG. 21(G)). The low-pass filter (LPF) 86 limits the bandwidth for the phase comparison result to output a low frequency element to a voltage controlled oscillator (VCO) 87. The voltage controlled oscillator 87 outputs the read/write clock R/W CK using an output signal of the low-pass filter 86. In this case, the voltage controlled oscillator 87 generates the read/write clock R/W CK with the frequency which is four times the frequency of the wobble signal WB. The frequency dividing circuit 85 sequentially divides the frequency of the read/write clock R/W CK to generate the clock CK and wobble clock WCK.

Thereby, the phase comparing circuit 84, frequency dividing circuit 85, low-pass filter 86 and voltage controlled oscillator 87 form a PLL circuit and generate the clocks R/W CK, CK, WK2 which are phase-synchronized with the timing where the wobble signal WB crosses the zero level and rises (that is, the timing having the correct phase information). In this case, the wobble clock WCK is generated with the shift of only $\pi/2$ for the correct edge of the binary signal S2.

Namely, in this embodiment, since the timing where the signal level of the wobble signal WB rises from 0 level or the timing where the signal level of the wobble signal WB falls to 0 level completely maintains the correct phase information of the carrier signal in the optical disc, when the wobble clock WCK is phase-synchronized with the binary signal S2, the oscillation frequency is controlled so that the mean value of the phase comparison result SCOM obtained via the low-pass filter 86 becomes constant.

In this case, for example, when the phase of the wobble clock WCK leads (FIG. 21(H)), the mean value is lowered (FIG. 21(I)) and the oscillation frequency is lowered in the phase comparison result SCOM. Thereby, the PLL circuit generates various clocks with reference to the rising edge of the wobble signal WB having the correct phase information.

However, in the binary signal S2 generated as explained above, a difference between the period where the logical level rises and the period where the logical level falls during the period T where the logical level rises again after it once has risen changes at the timing of the falling edge in the period T. Namely, this difference has the phase information of the timing where the wobble signal WB crosses the zero level and rises thereafter.

The wobble signal processing circuit 73 reproduces the wobble data ADIP utilizing such a relationship. Namely, as shown in FIGS. 22A–22H, the counter (CNT) 89 clears the count value with reference to the rising edge of the binary signal S2, counts up the read/write clock R/W CK while the logical level of the binary signal S2 is rising and counts down, on the contrary, the read/write clock R/W CK during the period where the logical level of the binary signal S2 is falling (FIG. 22(A) to 22(F)). The counter 89 detects the leading phase and lagging phase of the wobble signal WB for the wobble clock WCK with the count value CNT in units of half period of the wobble data ADIP.

A flip-flop (FF) 90 delays the count value CNT as much as half a period of the wobble data ADIP. A subtraction circuit 91 subtracts the output data of the counter 89 from the output data of the flip-flop 90. Thereby, the subtraction circuit 91 detects a change of the timing when the wobble signal WB crosses zero level with reference to the bit boundary and bit center of the wobble data ADIP and outputs the subtraction result L2 which is twice the count value CNT and is negative value when the timing changes to lead for the wobble clock WCK. On the contrary, when the timing changes to be delayed for the wobble clock WCK, the subtraction result H2 which is twice the count value CNT and is positive is output; and when the phase does not change, the subtraction result having the value 0 is output (FIG. 22(G)).

Accordingly, when the timing for zero-cross of the wobble signal WB before or after the bit boundary and bit center does not change, the area before and after this timing can be judged as the bit boundary depending on the modulation rule of the phase modulation. Moreover, when the subtraction value is positive or negative before and after this bit boundary, it can be judged as logic "1" or "0" in the wobble data ADIP. For instance, the subtraction value second next to the bit boundary does not have any meaning. In this embodiment, since the setting is made to execute once the bit inversion in the address data block by using the synchronization pattern, the bit boundary is reliably detected by the synchronization pattern of each wobble data frame.

Depending on this detection principle, the decoder 92 detects the bit boundary from the output data $\Delta\phi$ of the subtraction circuit 91. Moreover, with reference to the detected bit boundary, the subtraction value $\Delta\phi$ is determined for every period to decode and output the wobble data ADIP (FIGS. 22(G) and 22(H)).

In the mastering apparatus 61 in the second embodiment (FIG. 16), the wobble data ADIP is phase-modulated in the phase modulation circuit 77B to sequentially assign the first reference clock φ1 synchronized with the phase of the reference signal and the second reference clock φ2 which is different in phase from the first reference clock φ1 by 180 degrees depending on the logical level in order to generate the channel signal (ch) (FIGS. 17A–17E). In this case, the wobble data ADIP is subjected to the assignment of the first and second reference clocks φ1 and φ2 so that even-number channels are formed in the former half and latter half of each bit; and the logical 1 period becomes identical to the logical 0 period in the former half and latter half in the timing corresponding to each bit center of the wobble data ADIP; the wobble data ADIP is converted to the signal to be modulated in such a manner that the logical 1 and logical 0 periods become identical in the former half period and latter half period.

The channel signal (ch) generated as explained above allows insertion of the synchronization pattern and is subjected to assignment of the sine wave signal of the frequency of (n−d) and (n+d) in units of 0.5 cycle in the subsequent frequency modulation circuit 67C. Thereby, the wobble signal WB which clocks at the timings (ts) and (tc) corresponding to the bit center and bit boundary of the wobble data ADIP, respectively, can be generated.

In this case, since the even number channels are formed in the former half and latter half of each bit in the timing (tc) corresponding to the bit center of the wobble data ADIP and the channel signal (ch) is generated so that the logical 1 period becomes equal to the logical 0 period in the former half and latter half, the wobble signal WB is generated to cross the level at the timings (ts) and (tc) corresponding to the bit center and bit boundary of the wobble data ADIP, respectively.

Moreover, since the sine wave signals of the frequency (n−d) and (n+d) are assigned in units of 0.5 cycle, any one of the timings where a signal level of the wobble signal WB rises from 0 level or the timings where a signal level of the wobble signal WB falls to 0 level is completely maintained at the timings (ts) and (tc) corresponding to the bit center and bit boundary of the wobble signal ADIP, respectively; and the correct phase information of the carrier signal can, therefore, be maintained.

Moreover, in the timing of zero-cross of the remaining wobble signals WB not having the correct phase information, the wobble signal WB is held at the phase depending on the wobble data ADIP and is generated so that the phase error is controlled at zero as the average value within one bit of the wobble data ADIP.

Thereby, in the optical disc manufacturing process in this embodiment, the optical disc is manufactured through the predetermined processes from the original disc 2 by the mastering apparatus 61. In this optical disc, the center of the groove crosses the track center at the timing corresponding to the bit boundary and bit center of the wobble data.

In the optical disc apparatus 70 (FIG. 19), the process such as spindle control, etc. is carried out for the optical disc with reference to the tracing of the groove generated as explained above. In this case, in the wobble signal processing circuit 73, highly accurate clocks R/W CK, CK, WCK with reference to the tracing of the groove are generated; and the wobble data ADIP is reproduced.

Namely, in the wobble signal processing circuit 73 (FIG. 20 and FIGS. 21A–21I), the wobble signal WB is extracted from the push-pull signal PP; the timing of zero-cross is detected and the edge information is detected in the comparing circuit 83. Moreover, the clocks R/W CK, CK, WCK phase-synchronized with one edge having the correct phase information of the binary signal S2 output from the comparing circuit 83 are generated by the PLL circuit comprising the phase comparing circuit 84, frequency dividing circuit 85, low-pass filter 86 and voltage control oscillating circuit 87.

Namely, in the binary signal S2, all rising edges have the correct phase information and the remaining edges are displaced depending on the wobble data ADIP. A phase error is not generated at the timing of the edge having the correct phase information on average in units of one bit of the wobble data ADIP. Thereby, in this embodiment, the highly accurate clock having less frequency variation and phase variation as an average value can be generated.

The read/write clock R/W CK of the binary signal S2 is counted up and down by the counter 89 with reference to the timing of the rising edge, and the timing for zero-cross of the wobble signal WB is measured for every period with reference to the wobble clock WCK consisting of the period corresponding to the former half and latter half of the wobble data. In addition, in the subtraction circuit 31, the continuous count values are sequentially subtracted, a change of this timing is detected and the phase of the timing where the wobble signal WB crosses zero level and rises is detected through such change of the timing.

Accordingly, in the decoder 92, the bit boundary in which the phase does not change is detected, and the wobble data ADIP is sequentially reproduced from the phase change with reference to the bit boundary.

According to the structure in the second embodiment, the effect similar to that of the first embodiment can also be obtained by executing phase modulation of the signal corresponding respectively to the former half and latter half of each bit of the serial data in such a manner that the logical 1 period becomes equal to the logical 0 period; and by generating the wobble signal WB through assignment of the ,sine wave signals of the frequency (n−d) and (n+d) in units of 0.5 cycle to the signal to be modulated by the phase modulation method in the signal to be modulated by the phase modulation corresponding respectively to the former half and latter half of each bit of the serial data.

In this case, the wobble signal resulting in a zero phase error can be generated by averaging within one bit of the wobble data ADIP so that zero-cross occurs at the timings (ts) and (tc) corresponding to the bit centers and bit boundaries of the wobble data ADIP. Thereby, highly accurate clock with less frequency variation and phase variation, on average, can be generated; and user data can be recorded with higher accuracy when recording the user data at higher recording density by effectively using the information recording surface.

(3) Other Embodiments

In the first and second embodiments explained above, phase modulation is performed with reference to the first and second reference signals providing the difference in phase of 180 degrees, but the present invention is not limited thereto. It is also possible to phase-modulate the first and second reference signals, for example, having phase difference of 90 degrees.

Moreover, in the second embodiment, while the phase modulation has been conducted to assign four channels to one bit of the wobble data ADIP, the present invention is not limited thereto. As shown in FIGS. 23A–23D in comparison with FIGS. 17A–17E, the present invention can be applied when even number of channels are assigned to the former half and latter half of each bit of the wobble data ADIP, for example; that is, by respectively assigning four channels to the former half and latter half of each bit of the wobble data ADIP.

Moreover, in the second embodiment, the signal to be modulated by the frequency modulation method is generated by sequentially assigning the 0.5 frequency cycle of (n+d) and (n−d) to the signal to be modulated by the phase modulation method. But, the present invention is not limited thereto and as shown in FIGS. 24A–24C in comparison with FIGS. 17A–17E, highly accurate clock showing less amount of frequency variation and phase variation on average can be generated by assigning frequency cycles to each channel in units of one cycle (that is, by setting the number of frequency cycles corresponding to the rising logical level of the signal to be modulated by the phase modulation to be equal to the number of frequency cycles corresponding to the falling logical level of the signal to be modulated by the phase modulation in each bit of the wobble data).

Further, in the second embodiment, the clocks CK, WCK, etc. phase-synchronized with the wobble signal are generated by making use of the fact that the phase error of the wobble signal can be canceled by averaging one bit of the wobble data; but the present invention is not limited thereto, and it is also possible to generate a clock having a higher accuracy by selectively utilizing only the edge having the correct phase information.

In addition, in the first and second embodiments, the signal to be modulated by the frequency modulation and phase modulation methods is used directly as the wobble signal, but the present invention is not limited thereto. The present invention can also be applied in a case where the reference signal, for example, having a very short period in comparison with the signal to be modulated is inserted at the timing corresponding to the bit center of the wobble data.

Moreover, in the above embodiments, phase modulation through addition of the synchronization pattern to the wobble data has been explained, but the present invention is not limited thereto. It can be applied widely to cases where the synchronization pattern is not present.

In the above embodiments, the wobble data is generated by the address data comprising the track number, frame number and the error detection code, but the present invention is not limited thereto; and the error detection code may be eliminated for practical use. For example, it corresponds to a case where sufficient reliability can be assured through comparison of the track number or frame number by repeating the same track number or frame number several times.

In the above embodiments, address data is formed with the track number and frame number which sequentially change their values, but the present invention is not limited thereto. The present invention can also be applied widely to a case of generating, for example, the address data with a gray code, etc.

In the above embodiments, the wobble signal is generated with the address data comprising the track number and frame number but the present invention is not limited thereto; and it can also be applied widely where the wobble data is generated with the address data comprising time information.

In the above embodiments, the wobble data is generated with a continuous address data frame so that the track number and sync number change sequentially to generate the wobble signal, but the present invention is not limited thereto. The wobble signal may be generated by repeatedly assigning the same address data frame for a predetermined number of times.

Moreover, in the above embodiments, the signal to be modulated by the frequency modulation and the signal to be modulated by the phase modulation are used as the wobble signal, but the present invention is not limited thereto. The signal which can be obtained by inserting the reference signal such as a sine wave signal of short period into the signal to be modulated may be used as the wobble signal. Thereby, the timing can be detected from the reference signal.

In the above embodiments, the original disc is rotated under the condition that the angular velocity is constant, but the present invention is not limited thereto; and it is also possible that the original disc be rotated under the condition that the line velocity is constant whereby the tracing period of the groove converted to the line velocity becomes constant at the inner circumference and outer circumference of the disc. Moreover, the present invention can also be applied to a case of changing, step-by-step, the tracing period of the groove converted to the line velocity in the radial direction of the optical disc; and furthermore to a case of changing, step-by-step, the tracing period of the groove converted to the angular velocity in the radial direction of the optical disc.

In the above embodiments, the groove as a whole is traced with the wobble signal but the present invention is not limited thereto; and it can also be widely applied to cases where only a single side edge of the groove is traced, and both edges are traced with the wobble signal.

In the above embodiments, the clock is generated in the PLL circuit after the wobble signal is converted to the binary signal, but the present invention is not limited thereto. It is also possible to generate a clock through direct phase comparison of the wobble signal in the PLL circuit.

In the embodiments as explained above, the groove is formed so that the track pitch becomes 0.5 [μm] in the land/groove recording but the present invention is not limited thereto; and it can also be applied widely to formation of the groove with a narrow track pitch. Namely, as in the above embodiments, when recording the address data with the groove, the present invention can be applied to a case where the track pitch is set to 0.64 [μm] or less, according to a simulation result for the influence of the bit error by reducing thickness of the light transmitting layer. Thereby, the application efficiency of the information recording surface can be remarkably improved in comparison with the recording by the use of pre-pit. Moreover, the difference from using the pre-pit has been significant depending on a change of the reproduced signal RF when the thickness of the light transmitting layer is set to 177 [μm] or less. For instance, it is required to assure 10 [μm] as the thickness of the light transmitting layer. In the embodiments explained above, the thickness of the light transmitting layer is set to 0.1 [mm] but the present invention is not limited thereto, and it can also be widely applied to a case where the light transmitting layer is set between 10 to 177 [μm].

In the above embodiments, user data is recorded in line recording density of 0.21 [μm/bit], but the present invention is not limited thereto; and it can also be applied to a recording operation with line recording density of 0.23 [μm/bit] or less to provide the effect identical to that of the embodiments explained above. When converted to the bit length and mark length, the shortest bit length and shortest mark length correspond to 0.3 [μm] or less.

In the above embodiments, data is recorded to or reproduced from an optical disc by illuminating the disc with the laser beam of the wavelength of 650 [nm] through the optical system with the numerical aperture 0.7, but the present invention is not limited thereto and it can also be applied widely to high density recording of data with an optical system having a higher numerical aperture. When the thickness of the light transmitting layer and applicable working distance are considered, the effect identical to that of the above embodiments can be obtained when the numerical aperture is 0.7 or higher and the working distance is 560 [nm] or less.

In the above embodiments, the present invention is applied to an optical disc system with capacity of about 8 [MB], but the present invention is not limited thereto; and it can also be applied widely to various types of optical disc system for recording data with higher recording density.

In the above embodiments, the present invention is applied to an optical disc which can also record data, but it is not limited thereto and can also be applied to an optical disc for reproduction only.

As explained above, according to the present invention, even when data is recorded at a higher recording density than that of the related art, the address recorded on the optical disc can be reliably detected by effectively utilizing the information recording surface by recording the address data (such as position information, etc.) to the optical disc using the groove comprising the guide groove of the laser beam.

What is claimed is:

1. A method for manufacturing an optical disc having a light transmitting layer and an information recording surface for recording predetermined data by a laser beam directed to said information recording surface through said light transmitting layer, said method comprising the steps of:

providing a groove on said information recording surface for guiding said laser beam according to address data containing at least one of time information and position information;

setting a track pitch to up to about 0.64 $\mu$m in said groove; and forming said light transmitting layer having a thickness of up to approximately 177 $\mu$m.

2. The method according to claim 1, wherein said thickness of said light transmitting layer is between 10 and 177 $\mu$m.

3. A method for manufacturing an optical disc having a light transmitting layer and an information recording surface for recording predetermined data by a laser beam directed to said information recording surface through said light transmitting layer, said method comprising the steps of:

providing a groove on said information recording surface for guiding said laser beam according to address data containing at least one of time information and position information;

setting a track pitch to up to about 0.64 $\mu$m in said groove;

forming said light transmitting layer having a thickness of up to approximately 177 $\mu$m;

generating a first modulated signal by bi-phase modulating said address data;

generating a second modulated signal by frequency modulating the generated first modulated signal; and forming said groove on said optical disc in accordance with the generated second modulated signal.

4. The method according to claim 3, wherein a reference signal having a period shorter than said second modulated signal is inserted at a predetermined timing into said second modulated signal.

5. A method for manufacturing an optical disc having a light transmitting layer and an information recording surface for recording predetermined data by a laser beam directed to said information recording surface through said light transmitting layer, said method comprising the steps of:

providing a groove on said information recording surface for guiding said laser beam according to address data containing at least one of time information and position information;

setting a track pitch to up to about 0.64 $\mu$m in said groove;

forming said light transmitting layer having a thickness of up to approximately 177 $\mu$m:

generating a first modulating signal by bi-phase modulating said address data;

generating a second modulated signal by phase modulating the generated first modulated signal; and forming said groove on said optical disc in accordance with the generated second modulated signal.

6. The method according to claim 5, wherein a reference signal having a period shorter than said second modulated signal is inserted at a predetermined timing into said second modulated signal.

7. A method for manufacturing an optical disc having a light transmitting layer and an information recording surface for recording predetermined data by a laser beam directed to said information recording surface through said light transmitting layer, said method comprising the steps of:

providing a groove on said information recording surface for guiding said laser beam according to address data containing at least one of time information and position information;

setting a track pitch to up to about 0.64 $\mu$m in said groove;

forming said light transmitting layer having a thickness of up to approximately 177 $\mu$m;

assigning to said address data a track number and a frame number of an incident position of said laser beam on said optical disc;

adding a predetermined synchronization signal and an error detection code to said address data for forming a number of data blocks; and forming on said optical disc said groove representing said block data according to said address data.

8. The method according to claim 7, wherein said number of data blocks is assigned to one revolution of said groove on said optical disc.

9. The method according to claim 1, wherein a period during the forming of said groove converted into a rotating angle of said optical disc becomes substantially the same with respect to inner and outer circumferences on said optical disc.

10. The method according to claim 1, wherein a period during the forming of said groove converted into a length along a circumference of said optical disc becomes substantially the same with respect to inner and outer circumferences on said optical disc.

11. The method according to claim 1, wherein a width of said groove is substantially the same as a distance between adjacent grooves.

12. An optical disc, comprising:

a light transmitting layer having a thickness of up to approximately 177 $\mu$m;

an information recording surface for recording data by a laser beam directed to said information recording surface through said light transmitting layer, said information recording surface being utilized for reproducing the recorded data using said laser beam directed to said information recording surface through said light transmitting layer; and a groove located on said information recording surface for guiding said laser beam according to address data containing at least one of time information and position information, said groove being formed by setting a track pitch to up to about 0.64 µm.

13. The disc according to claim 12, wherein said thickness of said light transmitting layer is between 10 and 177 µm.

14. An optical disc, comprising:
- a light transmitting layer having a thickness of up to approximately 177 µm,
- an information recording surface for recording data by a laser beam directed to said information recording surface through said light transmitting layer, said information recording surface being utilized for reproducing the recorded data using said laser beam directed to said information recording surface through said light transmitting layer; and
- a groove located on said information recording surface for guiding said laser beam according to address data containing at least one of time information and position information, said groove being formed by setting a track pitch to up to about 0.64 µm;
- wherein a first modulated signal is generated by bi-phase modulating said address data and a second modulated signal is generated by frequency modulating the generated first modulated signal such that said groove is formed in accordance with the generated second modulated signal.

15. The disc according to claim 14, wherein a reference signal having a period shorter than said second modulated signal is inserted at a predetermined timing into said second modulated signal.

16. An optical disc, comprising:
- a light transmitting layer having a thickness of up to approximately 177 µm;
- an information recording surface for recording data by a laser beam directed to said information recording surface through said light transmitting layer, said information recording surface being utilized for reproducing the recorded data using said laser beam directed to said information recording surface through said light transmitting layer; and
- a groove located on said information recording surface for guiding said laser beam according to address data containing at least one of time information and position information, said groove being formed by setting a track pitch to up to about 0.64 µm;
- wherein a first modulated signal is generated by bi-phase modulating said address data and a second modulated signal is generated by phase modulating the generated first modulated signal such that said groove is formed in accordance with the generated second modulated signal.

17. The disc according to claim 16, wherein a reference signal having a period shorter than said second modulated signal is inserted at a predetermined timing into said second modulated signal.

18. An optical disc, comprising:
- a light transmitting layer having a thickness of up to approximately 177 µm;
- an information recording surface for recording data by a laser beam directed to said information recording surface through said light transmitting layer, said information recording surface being utilized for reproducing the recorded data using said laser beam directed to said information recording surface through said light transmitting layer; and
- a groove located on said information recording surface for guiding said laser beam according to address data containing at least one of time information and position information said groove being formed by setting a track pitch to up to about 0.64 µm;
- wherein a track number and a frame number of an incident position of said laser beam on said optical disc is assigned to said address data and a predetermined synchronization signal and an error detection code are added to said address data for forming a number of data blocks such that said groove is formed representing said block data according to said address data.

19. The disc according to claim 18, wherein said number of data blocks is assigned to one revolution of said groove on said optical disc.

20. The disc according to claim 12, wherein a period of said groove converted into a rotating angle of said optical disc becomes substantially the same with respect to inner and outer circumferences on said optical disc.

21. The disc according to claim 12, wherein a period of said groove converted into a length along a circumference of said optical disc becomes substantially the same with respect to inner and outer circumferences on said optical disc.

22. The disc according to claim 12, wherein a width of said groove is substantially the same as a distance between adjacent grooves.

* * * * *